(12) United States Patent
Eichenblatt

(10) Patent No.: US 9,619,955 B2
(45) Date of Patent: Apr. 11, 2017

(54) SYSTEMS AND METHODS FOR FACILITATING PACKAGE DELIVERY OR PICKUP

(71) Applicant: David L. Eichenblatt, Atlanta, GA (US)

(72) Inventor: David L. Eichenblatt, Atlanta, GA (US)

(*) Notice: Subject to any disclaimer, the term of this patent is extended or adjusted under 35 U.S.C. 154(b) by 0 days.

(21) Appl. No.: 15/043,979

(22) Filed: Feb. 15, 2016

(65) Prior Publication Data
US 2016/0247344 A1 Aug. 25, 2016

Related U.S. Application Data

(60) Provisional application No. 62/116,207, filed on Feb. 13, 2015.

(51) Int. Cl.
*G07C 9/00* (2006.01)
*H04N 7/18* (2006.01)
(Continued)

(52) U.S. Cl.
CPC ....... *G07C 9/00896* (2013.01); *A47G 29/124* (2013.01); *A47G 29/141* (2013.01);
(Continued)

(58) Field of Classification Search
CPC .............. A07C 9/00896; A47G 29/124; A47G 2029/145; A47G 2029/149; A47G 29/141;
(Continued)

(56) References Cited

U.S. PATENT DOCUMENTS 5,161,328 A 11/1992 Traue
1,186,565 A 6/1996 Fogg
(Continued)

FOREIGN PATENT DOCUMENTS

AU 2013100961 A4 8/2013
AU 2014100457 A4 6/2014
(Continued)

OTHER PUBLICATIONS

Hunt, et al., "Home delivery growth leads to quest for a smart mailbox," http:/articles.chicagotribune.com/2001-05-26/news/0105260146_1_zbox-delivery-smart, Nov. 20, 2014.

*Primary Examiner* — Sisay Yacob
(74) *Attorney, Agent, or Firm* — Maynard, Cooper & Gale, PC; Jon E. Holland

(57) ABSTRACT

A system for facilitating package delivery or pickup at premises of senders or recipients has a package door that is used for receipt and collection of packages. The package door includes an input device for entering package information and an image capture device for visually recording the arrival of a courier. Based on the package information entered via the input device, the system determines whether the package information matches a predetermined value, such as a package tracking number. The system may automatically unlock the package door if the package information matches such predetermined value. In other embodiments, a user may remotely monitor the package information and/or information from the image capture device to determine whether to provide inputs for unlocking the package door. The system logs the package information received from the input device and the image capture device.

28 Claims, 12 Drawing Sheets

(51) Int. Cl.
 *A47G 29/124* (2006.01)
 *A47G 29/14* (2006.01)
 *G07F 17/00* (2006.01)

(52) U.S. Cl.
 CPC ......... *G07C 9/00571* (2013.01); *G07F 17/00* (2013.01); *H04N 7/183* (2013.01); *A47G 2029/145* (2013.01); *A47G 2029/149* (2013.01)

(58) Field of Classification Search
 CPC ............ G07C 9/00571; G07C 9/00896; H04N 7/183; G07F 17/00
 See application file for complete search history.

(56) References Cited

U.S. PATENT DOCUMENTS

| | | | |
|---|---|---|---|
| 5,774,053 A | 6/1998 | Porter | |
| 5,979,750 A | 11/1999 | Kindell | |
| 6,967,575 B1 | 11/2005 | Dohrmann et al. | |
| 6,987,452 B2 | 1/2006 | Yang | |
| 7,815,112 B2 | 10/2010 | Volpe et al. | |
| 2001/0050615 A1* | 12/2001 | Kucharczyk | A47G 29/141 340/568.1 |
| 2002/0005774 A1* | 1/2002 | Rudolph | G06F 21/35 340/5.61 |
| 2002/0089434 A1* | 7/2002 | Ghazarian | G06Q 10/08 340/988 |
| 2002/0180580 A1* | 12/2002 | Gotfried | A47G 29/141 340/5.2 |
| 2003/0231112 A1 | 12/2003 | Raju | |
| 2004/0238615 A1* | 12/2004 | Offenbacher | A47G 29/124 232/29 |
| 2006/0020489 A1 | 1/2006 | Rivalto | |
| 2006/0119471 A1* | 6/2006 | Rudolph | G06Q 10/08 340/10.41 |
| 2006/0122852 A1 | 6/2006 | Moudy | |
| 2006/0208852 A1* | 9/2006 | Wenzlik | G07C 9/00166 340/5.28 |
| 2007/0247276 A1 | 10/2007 | Murchison et al. | |
| 2008/0136908 A1* | 6/2008 | Carter | H04M 11/025 348/143 |
| 2011/0248818 A1* | 10/2011 | Hashim-Waris | G06Q 30/0235 340/5.52 |
| 2012/0158606 A1 | 6/2012 | Moudy | |
| 2014/0090299 A1 | 4/2014 | Brown | |
| 2014/0190081 A1* | 7/2014 | Wanjohi | A47G 29/126 49/25 |
| 2015/0120529 A1* | 4/2015 | Faaborg | G06Q 10/083 705/39 |
| 2015/0186840 A1* | 7/2015 | Torres | A47B 81/00 705/339 |

FOREIGN PATENT DOCUMENTS

| | | |
|---|---|---|
| BE | 1013597 A3 | 4/2002 |
| CN | 10371141 A | 4/2014 |
| GB | 2362924 A | 12/2001 |
| GB | 2394509 A | 4/2004 |
| GB | 2427652 A | 1/2007 |
| JP | 4399289 B2 | 8/2005 |
| KR | 101024620 B1 | 3/2011 |
| KR | 1020110039414 A | 4/2011 |
| WO | 2013/158568 A1 | 10/2013 |

\* cited by examiner

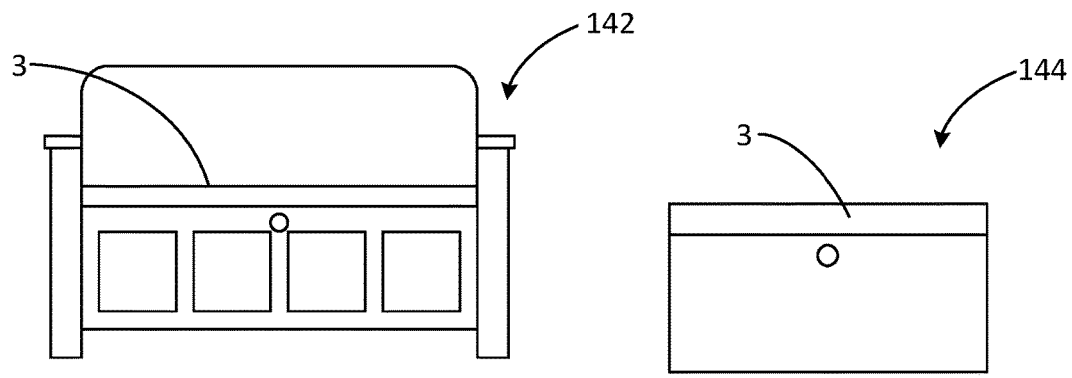
*FIG. 12*  *FIG. 13*
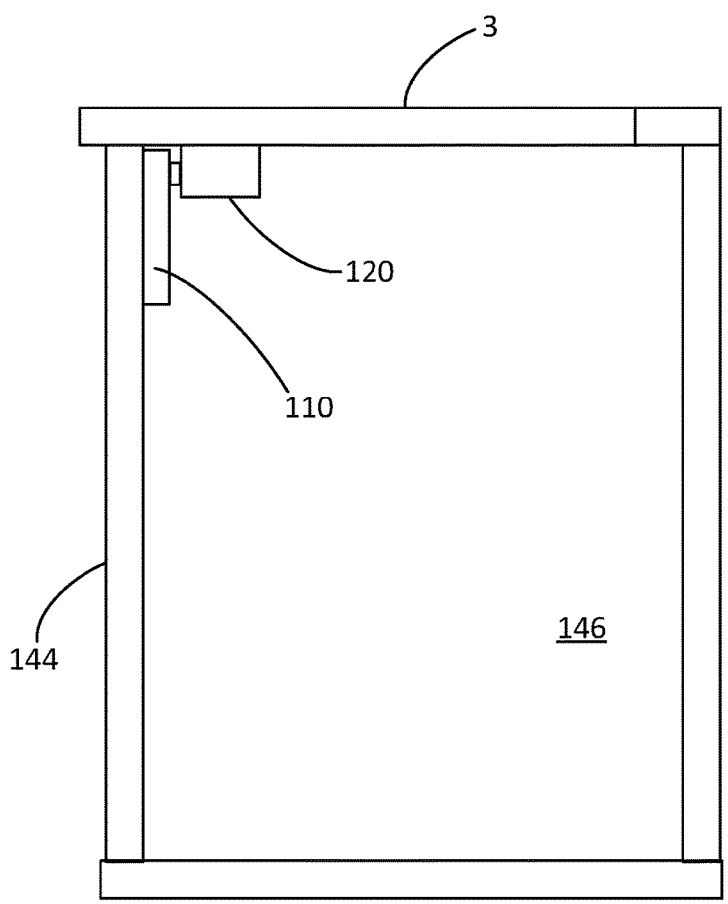
*FIG. 14*

SYSTEMS AND METHODS FOR FACILITATING PACKAGE DELIVERY OR PICKUP

CROSS-REFERENCE TO RELATED APPLICATIONS

This application claims the benefit of U.S. Provisional Application No. 62/116,207, entitled "Systems and Methods for Facilitating Package Delivery or Pickup," and filed Feb. 13, 2015, which application is hereby incorporated by reference in its entirety.

BACKGROUND

The growth of electronic commerce has enabled consumers to conduct a large percentage of their shopping online, resulting in a large volume of packages being delivered to homes and businesses. In addition, online shopping is just one of many activities that are causing expansions within the delivery industry, and shipments are often associated with considerable amounts of data, including the identification of the sender, the recipient, the courier (which may be the same entity as the sender), the package contents, and the times of both collection and delivery of the package.

Often, however, packages are collected and delivered when the sender and recipient, respectively, are not present. This presents a particular challenge for packages that require special handling, which can be costly for all constituents in the supply chain. Food or other perishable items, for example, may spoil if left exposed to outside temperatures or if collection is delayed due to the inability of the courier to access the package. Risks are also added when the contents of the package are more expensive. In addition, packages left for delivery or pickup on a doorstep or other location outside of a residence are vulnerable to theft and other risks, such as damage from weather. Redelivery is also a significant problem for couriers and can provide convenience issues for the customer. Accordingly, high value packages may require special handling for security or require insurance against loss or theft. As an example, a sender of a package may require a signature of the recipient before delivery is permitted. The signature requirement may complicate shipment logistics and also may add a delay to the delivery process when the recipient is unavailable to receive the shipment from the courier, which can often result in multiple redelivery attempts and involving additional costs.

For these and other reasons, current package collection and delivery methods are inconvenient despite the amount of information available to predict collection and delivery times. Projected collection and delivery times provided by couriers are often mere estimates and do not alleviate the inability to be physically present for the collections and deliveries. As such, a solution is needed for the collection and delivery of packages to occur safely, securely and with certainty without anyone being present at the property.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

FIGS. 12 and 13 are illustrations of alternate structures incorporating a package door.

FIG. 14 is a side, cross-sectional view of the box of FIG. 13.

DETAILED DESCRIPTION

The present disclosure generally pertains to systems and methods for facilitating package delivery or pickup at premises of senders or recipients. In one exemplary embodiment, a system has a package door that is used for receipt and collection of packages. In the system, the package door may include an input device for entering package information and an image capture device for visually recording the arrival of a courier. At least one wireless transceiver is attached to the input device and to the image capture device, and the transceiver is operable to wirelessly transmit the information obtained from the input device and the image capture device to a remote device. Based on the package information entered via the input device, the system determines whether the package information matches a predetermined value, such as a package tracking number. The system may automatically unlock the package door if the package information matches the predetermined value. In other embodiments, a user may remotely monitor the package information and/or information from the image capture device to determine whether to provide the inputs for unlocking the package door. The system can log a variety of package information received from the input device and the image capture device.

Figure 1:
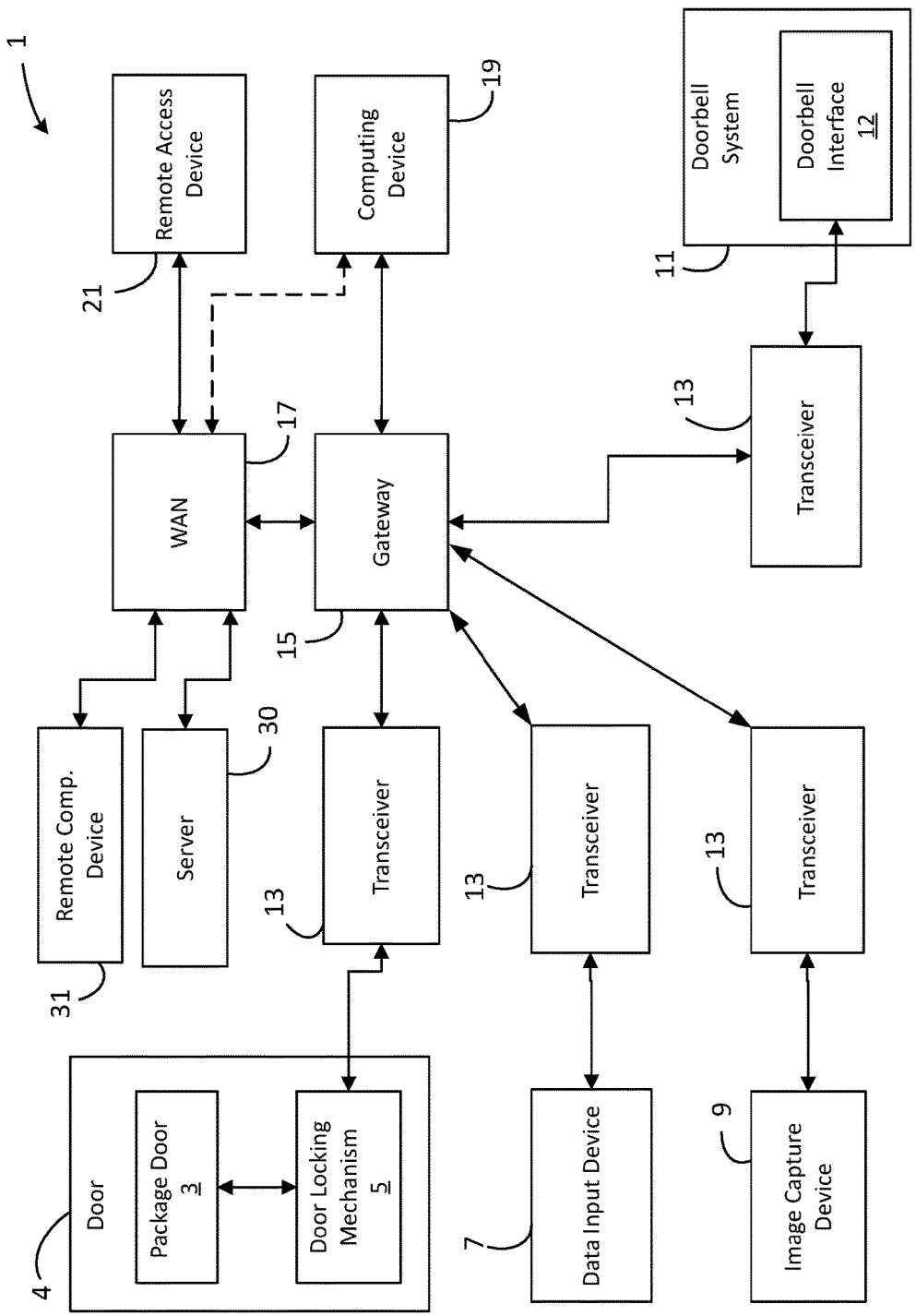
FIG. 1 is a block diagram depicting a package door system.

FIG. 1 depicts a block diagram of a package door system 1 for facilitating the collection and delivery of packages. As shown by FIG. 1, the system 1 includes a package door 3, door locking mechanism 5, data input device 7, image capture device 9, and doorbell system 11. In one embodiment, the data input device 7, image capture device 9, and doorbell system 11 can be separate devices as shown in FIG. 1. However, in other embodiments, two or more of the data input device 7, image capture device 9, and doorbell system 11 may be incorporated into a single device. The doorbell system 11 includes a doorbell interface 12, such as a button, that when activated (e.g., pressed by a user) causes the doorbell system 11 to provide an audio or visual output to the operator of the system 1 to indicate a presence of a user at the package door 3 (or door 4). In certain embodiments, the package door 3 can be mounted in a larger-sized door 4 and be movable with respect to the door 4 so that the package door 3 may be opened while the door 4 remains closed. In other embodiments, it is unnecessary for the package door 3 to be mounted in the door 4. As an example, the package door 3 may be mounted directly within a wall of a house or other building so that packages may be delivered through the wall by opening the package door 3. The package door 3 may also be incorporated in a garage door or warehouse door. Other embodiments may also include a freestanding customized box, such as a drop box or mailbox, or customized furniture, e.g., a bench or chair, incorporating a box into the design of the furniture, where the package door 3 is mounted on the box and is controlled or used as described herein to provide access to the interior of the box. In yet other embodiments, the package door 3 may be positioned at other locations and mounted on other types of structures.

Referring to FIG. 1, the door locking mechanism 5, data input device 7, image capture device 9, and the doorbell interface 12 can each be coupled to a separate transceiver 13. However, in other embodiments, two or more of the door locking mechanism 5, data input device 7, image capture device 9, and doorbell system 11 may share a transceiver 13. In certain embodiments, the data input device 7 and image capture device 9 are mounted on and coupled to the door 4, though is it is possible that the data input device 7 and the image capture device 9 can be mounted on or coupled to other structures, such as an adjacent wall, near the package door 3. As an example, in certain embodiments, the data input device 7 and/or the image capture device 9 may be mounted on a wall of a house or other building in which the package door 3 (or door 4) are mounted or alternatively the data input device 7 and/or the image capture device 9 may be mounted on the package door 3 (or door 4). Further, the door locking mechanism 5 is used to selectively lock the package door 3 and can be incorporated in one or more of the package door 3 and the structure surrounding the package door 3, e.g., door 4 or a wall of the house or other building. That is, when the package door 3 is in a closed position and locked by the door locking mechanism 5, the package door 3 is prevented from moving with respect to the door 4 or other structure in which the package door 3 is mounted. The package door 3 should remain in a closed position thereby preventing a person or object from passing through the doorway of the package door 3 into the house or other building in which the package door 3 is positioned. As an example, to lock the package door 3, the locking mechanism 5 may move a deadbolt 18 (see FIG. 4) to engage both the package door 3 and the structure surrounding the package door 3, and to unlock the package door 3, the door locking mechanism 5 may move the deadbolt 18 such that it is contained in one of the package door 3 or the structure surrounding the package door 3. In another embodiment, the door locking mechanism 5 may move the keeper of an electronic striker lock to lock or unlock the package door 3. In still other embodiments, other techniques and devices for locking and unlocking the package door 3 are possible. In other embodiments, other types of devices may be incorporated into the system 1 and be used to communicate with or operate under the control of the computing device 19 or remote computing device 31.

In addition to controlling the lock state of the package door 3, the system 1 also tracks information associated with packages that are delivered through the doorway of the package door 3. As an example, certain information may be electronically or optically captured and stored by the system 1 so that the information defines a history of package deliveries or pickups at the location of the package door 3. For example, the system 1 may capture the time of delivery or pickup, a tracking number or other identifier of the package, contact information (e.g., name or address) of the sender or recipient, or an identifier of a courier service used to deliver the package. Exemplary techniques for capturing such information will be described in more detail below.

Further, as described above, the doorbell system 11 has an interface 12, such as a button, that is located in close proximity to the package door 3 (e.g., on a door frame or wall of a house or other building in which the package door 3 is mounted). When the interface 12 is activated (e.g., pressed) by a user at the package door 3, the doorbell system 11 generates a sound or other type of output within the building to signal the presence of a person at the package door 3. In addition, as will be described in more detail below, when activated, the doorbell system 11 may transmit notices or commands to other devices of the system 1, such as the image capture device 9 or a remote access device 21. Such notices may be transmitted wirelessly or via physical media and may include email messages, text messages, audio/video messages or other types of messages.

In certain embodiments, the package door 3 is a conventional door, such as the exterior door of a house, and is not mounted on another door 4. The package door 3 may be sized large enough to permit a person to pass through its doorway (e.g., over six feet in height), or the door may be smaller to permit packages to pass without necessarily allowing a full-grown person to pass. In other embodiments, the package door 3 may be a door that is a subsection of a larger-sized door 4 (see e.g., FIG. 4); a security gate, such as wrought iron exterior gate; a garage door; a door for a drop box, mail box, large box or bench; a door through a building wall; and other types of doors.

The data input device 7 can accept the inputs associated with a particular package, such as the tracking number or other package identifier associated with the package or a password provided to the courier delivering the package. In an exemplary embodiment, the data input device 7 is a keypad where a user can select keys of the keypad to enter characters, such as letters or numbers, but other types of data input devices 7 are possible in other embodiments including, but not limited to, scanners (e.g., barcode or biometric scanners), touchpads, tablet computers, key fobs, and like devices.

The image capture device 9 is configured and positioned to capture visual information associated with a particular package, such as a digital photograph or a video of the courier and/or the package. In an exemplary embodiment, the image capture device 9 is a tablet computer, such as an I-Pad®, equipped with a camera and a display screen, but other types of image capture devices 9 are possible in other embodiments. The image capture device 9 of FIG. 4 has an embedded camera that has a lens 14 for receiving light of a scene to be captured by the camera. The camera is configured to convert the light to digital data defining an image of the scene exposed through the lens 14.

Figure 4:
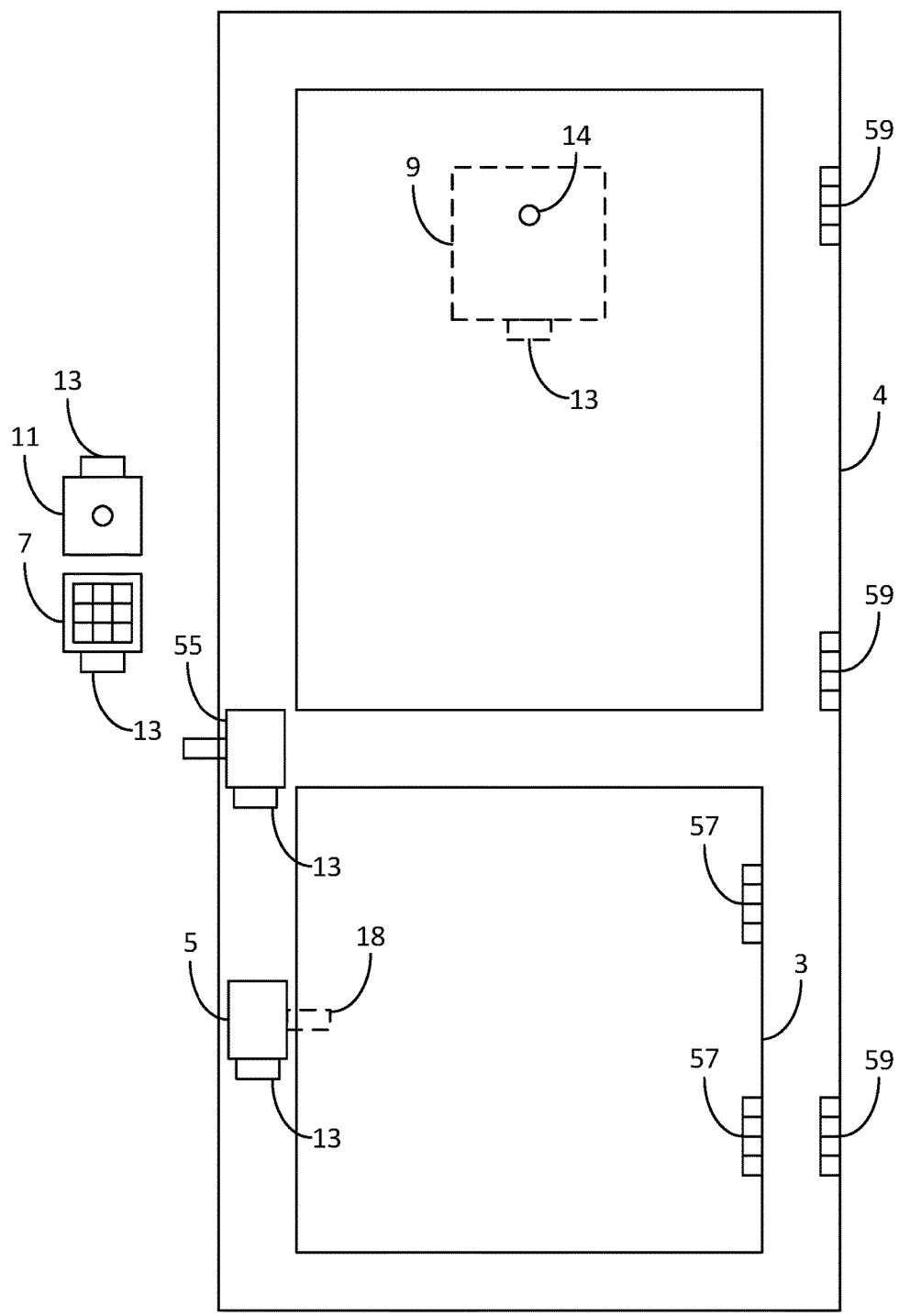
FIG. 4 is an illustration of an exemplary embodiment of various components of a package door system, such as is depicted by FIG. 1.
Figure 5:
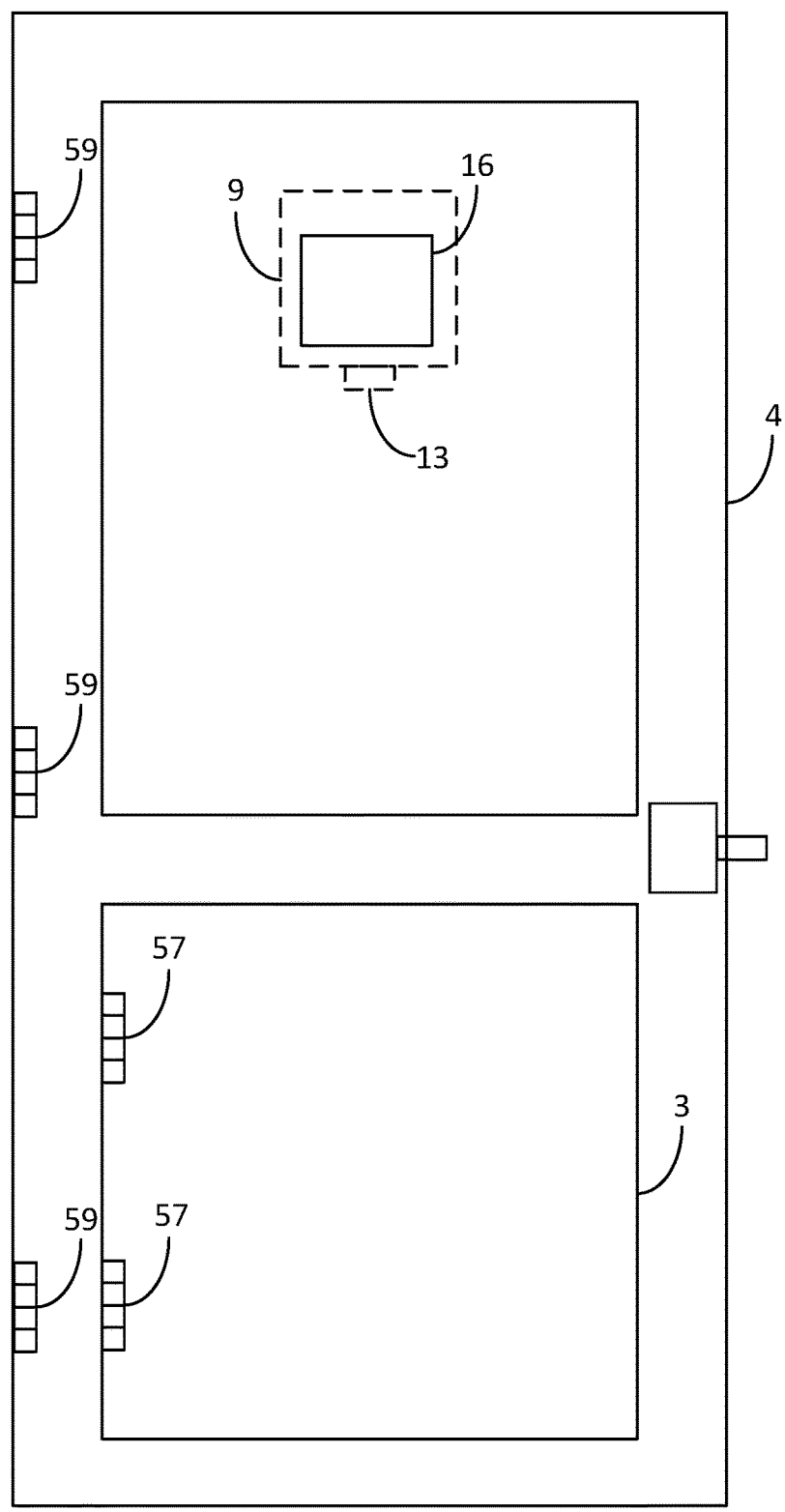
FIG. 5 is an illustration of a backside of a door shown by FIG. 4.

In the embodiment shown by FIG. 4, the image capture device 9 is embedded in the door 4 or mounted such that only the lens 14 is visible from the perspective shown by FIG. 4. In such case, the lens 14 may appear as a peephole of the door 4. As shown by FIG. 5, the other side of the image capture device 9 (without lens 14) can have a display screen 16 for displaying digital images. The image captured by the camera of the image capture device 9 is displayed on the display screen 16 such that the image capture device 9 can function as an electronic peephole. For example, the camera of the image capture device 9 captures an image of the scene on the exterior side of the door 4 (or wall), and the captured image is displayed by the display screen 16 so that a person on the interior side of the door 4 (or wall) can see the captured image. Thus, if a person is standing in front of the door 4 outside of the house or other building, an image of such person should be displayed on the display screen 16 inside of the house or other building or on a remote device, such as mobile phone or desktop computer. Note that the device 9 may be embedded in the door 4 such that only the lens 14 is visible on one side of the door 4 and the only the display screen 16 is visible on the opposite side of the door 4, although other configurations are possible. As an example, it is possible for the image capture device 9 to be mounted on an interior side of the door 4 and for the lens 14 to be aligned with a peephole in the door 4 that allows light to pass from the exterior side of the door to the lens 14. Yet other configurations and locations of the image capture device 9 are possible in other embodiments. As an example, the image capture device 9 may be mounted on a wall of the house or other building in which the package door 3 (or door 4) is mounted. It is also possible for the image capture device 9 to be incorporated within the door locking mechanism 5, the doorbell system 11 or the data input device 7.

In addition to displaying captured images via the display screen 16, the captured images may be wirelessly transmitted for archiving or other purposes. For example, as will be described in more detail below, when a person at the package door 3 activates the doorbell interface 12 or otherwise indicates his presences at the package door 3, the image capture device 9 may use the wireless transceiver 13 coupled to it in order to wirelessly transmit a message to a remote access device 21, such as a cellular telephone, that includes a digital photograph or video of one or more images captured by the image capture device 9. Thus, the user of the remote access device 21, such as the owner or occupant of the house or building in which the package door 3 is mounted, may view the images and decide, based on the images, whether to unlock the package door 3. If so, the user may transmit a command for unlocking the package door 3 from the remote access device 21 to the door locking mechanism 5, as will be described in more detail below.

Referring to FIG. 1, each transceiver 13 is configured to communicate with a gateway 15. In an exemplary embodiment, the transceivers 13 communicate with the gateway 15 via radio frequency (RF) signals, but other types of wireless signals (e.g., cellular) are possible. In addition, various wireless protocols may be used to communicate signals with the gateway 15 including, but not limited to, Wi-Fi, Bluetooth, NFC and Z-wave. Further, it possible for any of the transceivers 13 to be coupled to the gateway 15 or other communication devices via a physical medium, such as a conductive or optical connection, so that wireless communication is unnecessary. In an exemplary embodiment, the gateway 15 is a residential router that forms a local area network (LAN) over which the transceivers 13 and a computing device 19 may communicate, but other types of gateways are possible in other embodiments. The gateway 15 is configured to communicate with and provide access to a wide area network (WAN) 17, such as the Internet.

Figure 2:
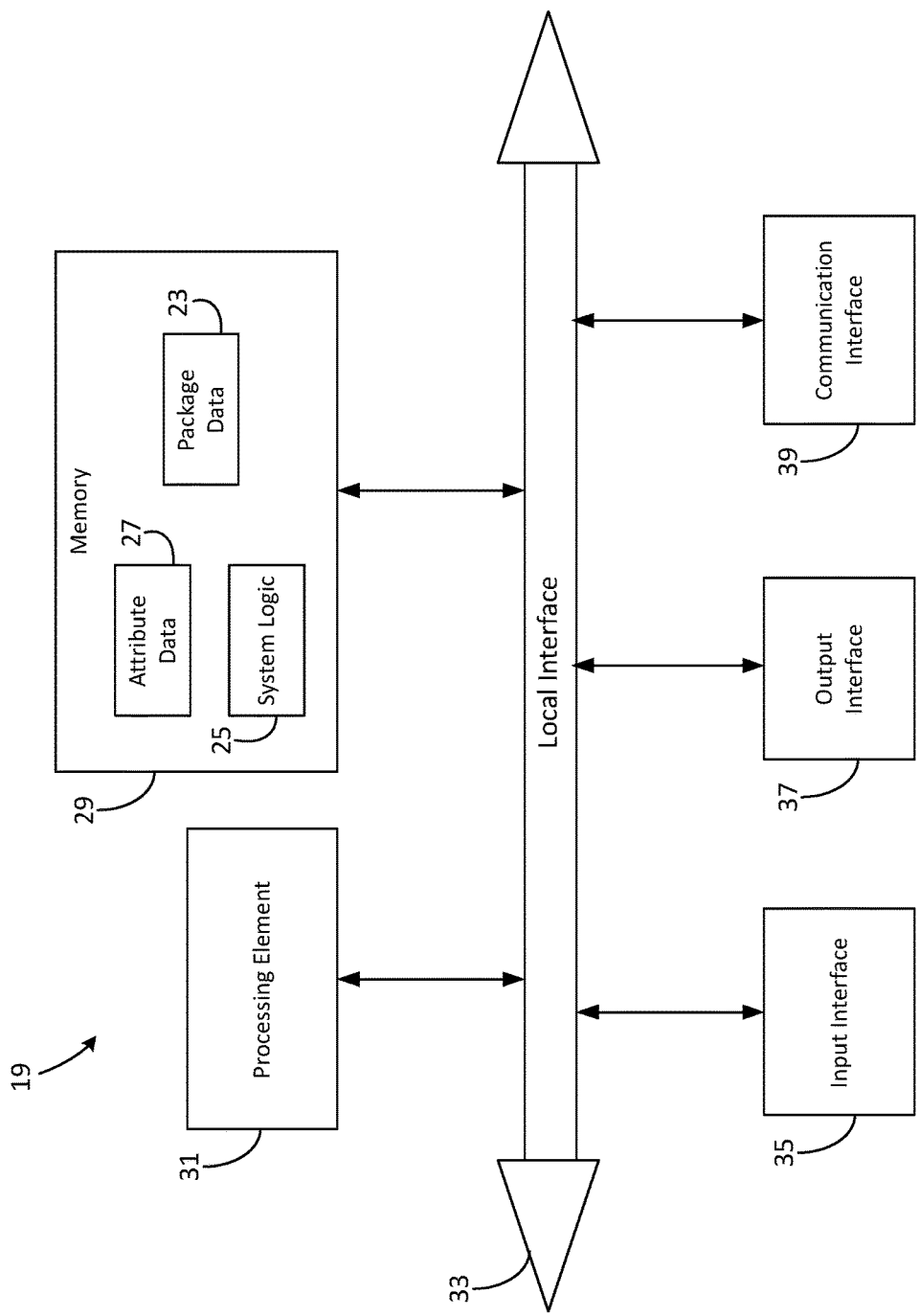
FIG. 2 is a diagram illustrating an exemplary embodiment of a computing device, such as is depicted by FIG. 1.

Data collected by the data input device 7, image capture device 9, and doorbell system 11, such as barcodes, tracking numbers, photographs, videos, instances of doorbell presses, sender identifier, recipient identifier, courier identifier, demographic information, transactional information, and timestamps associated with certain events (e.g., doorbell presses, package delivery or pickup, or data input events for any of the information collected by the data input device 7), are stored in memory 29 (see FIG. 2) of the computing device 19 as package data 23 (see FIG. 2). In certain embodiments, as shown in FIG. 2, the computing device 19 includes system logic 25 that is configured to control the operation of the system 1 as will be described in more detail below. As shown by FIG. 2, attribute data 27 is also stored in memory 29. The attribute data 27 indicates at least one attribute of a package expected to be delivered to or picked up through the doorway of the package door 3. The system logic 25 is configured to determine whether the package data 23 corresponds to at least one attribute defined by the attribute data 27. For example, prior to arrival of a package, the package's tracking number may be stored in the attribute data 27, which the system logic 25 may then compare with the package data 23 entered via the data input device 7 or otherwise obtained by the system logic 25. If the tracking numbers match, the system logic 25 may provide a command to the door locking mechanism 5 to unlock so that the package door 3 can be opened in order to deliver a package to or retrieve a package from the house or other building in which the package door 3 is mounted.

Note that an unlocking event to unlock the package door 3 for a particular package (or group of packages) may be a one-time event. For example, once a tracking number match occurs or the door locking mechanism 5 otherwise receives an instruction to unlock, the package door 3 may remain unlocked for a predefined time period long enough (e.g., about 30 seconds or so) to permit a person to make a delivery or pickup of one or more packages through the doorway of the package door 3. After such predefined period, the locking mechanism 5 may be configured to automatically lock the package door 3. In an alternative embodiment, a motion sensor (not shown) or other type of sensor may sense the presence of a person at the package door 3, and once an unlocking event occurs, the locking mechanism 5 may lock the package door 3 once the motion sensor other type of sensor detects that the person has left the proximity of the package door 3. Once the package door 3 is unlocked in response to the match of a tracking number or other package identifier, then the tracking number or package identifier is no longer valid for causing an unlock event to occur. Thus, if the same package identifier is later presented to the system 1, the package door 3 will not be unlocked based on the package identifier, thereby preventing a user from using the tracking number or other package identifier of a previously-delivered package to unlock the package door 3.

Note that the functions described herein for the computing device 19 may be performed at various locations. As an example, the system 1 may include a remote computing device 31 (e.g., a server) that can perform any of the functions described herein for the computing device 19. The computing device 19 may be local to (e.g., at the premises of) the structure in which the package door 3 is mounted, and the remote computing device 31 may be at a remote location communicating with any of the other components of the system through the WAN 17 or other type of network. In such embodiment, the computing device 19 may collect package data 23 from the data input device 7, the image capture device 9, and/or the doorbell system 11 and upload such data 23 to the remote computing device 31, which then performs any of the functions described herein for the computing device 19, such as controlling the locking state of the door locking mechanism 5, tracking of package deliveries or pickups, or associating a customer identifier with the package data 23. As an example, the system logic 25 or any portion of the system logic 25 may be implemented on the remote computing device 31 if desired. For illustrative purposes, it will be assumed hereafter that the system logic 25 is implemented on the computing device 19 unless otherwise indicated, but it should be emphasized that any of the functions of the system logic 25 can be performed by the remote computing device 31.

In certain embodiments, the system logic 25 is configured to transmit a notification to a remote access device 21 upon the entry of information via the data input device 7, image capture device 9, and/or the doorbell system 11. In certain embodiments, the notification is in the form of an e-mail, but other methods of delivery are contemplated including, but not limited to, text messages, picture messages, and video messages. In certain embodiments, the notification provides a real-time video feed to the user of the remote access device 21 showing images captured by the image capture device 9 so that a user of the remote access device 21 can see who is at the package door 3.

A remote access device 21 is configured to communicate with the computing device 19 through the WAN 17. The remote access device 21 is any device capable of communicating data and interfacing with a user. In certain embodiments, the remote access device 21 may be configured to render (e.g., display) information from the computing device 19. As an example, the remote access device 21 may be a personal computer (e.g., a desktop or laptop) or a hand-held device, such as a personal digital assistant (PDA), cellular telephone, or tablet computer. The remote access device 21 may be configured to initiate unlocking of the door locking mechanism 5 in response to a command by the user. For example, the user may receive a notification from the computing device 19 indicating the input of a package's tracking number into the data input device 7 whereby the user may use the remote access device 21 to signal the computing device 19 to unlock the door locking mechanism 5.

In certain embodiments, the WAN 17 includes the Internet, and messages are communicated in accordance with transmission control protocol/Internet protocol (TCP/IP), but other protocols and network types are possible in other embodiments. The remote access device and/or gateway 15 may be configured to communicate with the WAN 17 wirelessly (e.g., via cellular signals) or alternatively may be coupled to the WAN 17 via a physical medium, such as a conductive or optical connection, that can be used for communicating data.

FIG. 2 depicts an exemplary embodiment of a computing device 19. The computing device 19 may be any device capable of processing and communicating data, such as a personal computer (e.g., a desktop or laptop) or a hand-held device, such as a personal digital assistant (PDA), cellular telephone, or tablet computer. In one embodiment, the computing device 19 is separate from the data input device 7, image capture device 9, and doorbell system 11, but may be incorporated into one or more of the data input device 7, image capture device 9, and doorbell system 11 in other embodiments. As shown by FIG. 2, the computing device 19 has logic 25, referred to herein as "system logic," for generally controlling the operation of the system 1, as will be described in more detail hereafter, including communicating with the WAN 17. The system logic 25 can be implemented in software, hardware, firmware or any combination thereof. In the exemplary computing device 19 illustrated by FIG. 2, the system logic 25 is implemented in software and stored in memory 29. Note that the system logic 25, when implemented in software, can be stored and transported on any computer-readable medium for use by or in connection with an instruction execution apparatus that can fetch and execute instructions.

The exemplary computing device 19 depicted by FIG. 2 has at least one conventional processing element 31, which has processing hardware for executing instructions stored in memory 29. As an example, the processing element 31 may include a central processing unit (CPU) or a digital signal processor (DSP). The processing element 31 communicates to and drives the other elements within the computing device 19 via a local interface 33, which can include at least one bus. Furthermore, an input interface 35, for example, a keypad, keyboard or a mouse, can be used to input data from a user of the computing device 19, and an output interface 37, for example, a printer, monitor, liquid crystal display (LCD), or other display apparatus, can be used to output data to the user. Further, a communication interface 39 may be used to communicate with the gateway 15 (FIG. 1) and/or WAN 17 or other component of the system 1.

As shown by FIG. 2, package data 23 is stored in memory 29 at the computing device 19. The package data 23 includes information, such as tracking numbers and their associated timestamps received from the data input device 7, photos and videos and their associated timestamps received from the image capture device 9, and doorbell presses and their associated timestamps received from the doorbell system 11. The package data 23 may also store any information captured by the system 1, such as a sender identifier (e.g., name and/or address), a recipient identifier, a courier identifier, customer demographic information, or transaction information.

In one exemplary embodiment, the package data 23 defines a history of the packages received through the system 1. Thus, the package data 23 may be analyzed to determine when and how often packages received over time. In certain embodiments, the attribute data 27 defines package tracking numbers that can be compared to the package data 23 to determine whether particular packages are collected or delivered as scheduled. The attribute data 27 may be entered manually, for example by a user of the computing device 19, or provided from the remote access device 21. In one exemplary embodiment, the attribute data 27 is downloaded from a server 30 that is in communication with the computing device 19 via the WAN 17 or otherwise.

As an example, the server 30 may be operated by a courier service that is delivering the package. The server 30 may store a tracking number for each package to be delivered by the courier service, and such tracking number for a given package is unique relative to the tracking numbers used for other packages. That is, the tracking number associated with a given package uniquely identifies the package relative to the other packages delivered by the courier service. Each tracking number is correlated with various attribute information pertaining to the associated package, including for example, the names and addresses of the package's sender and recipient, date of pickup and expected date of delivery. From time-to-time, the system logic 25 is configured to contact the server 30 and to retrieve attribute information pertaining to packages correlated with a particular sender or recipient, such as a person located at the house or other building in which the package door 3 is mounted. The attribute information to be retrieved may be found based on the name, address, or other identifier of such person. As an example, the system logic 25 may retrieve the tracking number of each package to be delivered to or picked up from the identified person within a certain time period (e.g., over the next day or two), as well as other attribute information associated with such tracking numbers. The retrieved information may be stored in memory 29 as part of the attribute data 27, and the attribute data 27 may be used to determine whether to unlock the door locking mechanism 5.

For example, upon a courier's arrival at the package door 3, the courier may enter a particular tracking number using the data input device 7, and the system logic 25 may compare such tracking number to the tracking numbers stored in the attribute data 27 previously retrieved from the server 30 or otherwise received by the computing device 19. If the tracking number received from the courier by the data input device 7 matches one stored in the attribute data 27, the system logic 25 may automatically transmit a signal to the door locking mechanism 5 to cause it to unlock, thereby allowing the package door 3 to be opened so that a package can be delivered to or picked up from the interior of the house or other building in which the package door 3 is mounted. Conversely, if the tracking number received from the courier by the data input device 7 does not match any of the tracking numbers stored in the attribute data 27, the system logic 25 may refrain from unlocking the door locking mechanism 5, thereby preventing the person at the package door 3 from gaining access to the interior of the house or other building in which the package door 3 is mounted. In such a case, the system logic 25 may also transmit a notification to a remote access device 21, whereby the user is alerted to the unsuccessful attempt to unlock the door locking mechanism 5, and the notification may include image data (e.g., one or more photos or videos) captured by the image capture device 9 close to the time of such attempt.

In certain embodiments, the package door 3 may open by swinging on hinges 57 (see FIG. 4), although other mechanisms for opening the package door 3 are possible, including, but not limited to, tracks on which the package door 3 may slide. The package door 3 may be configured to open in any direction, e.g., swinging towards or away from the user. In other embodiments, the package door 3 may slide horizontally or vertically to open and close the doorway.

Note that it is possible for a representative of the courier service to deliver or pickup more than one package at a stop. The system 1 can be designed to collect various information about the packages, and the system 1 can accommodate the possibility of multiple packages being delivered or picked up at the same time. As an example, before the package door 3 is unlocked, the data input device 7 may be configured to prompt a user to enter the number of packages being delivered or picked up so that the total number of packages delivered or picked up can be accurately tracked. Alternatively, the system 1 may have a sensor (not shown) for sensing the number of packages delivered or picked up for each unlock event. As an example, the sensor may be an infrared sensor or other type of sensor for detecting movement of a package through the doorway of the package door 3. Such sensor may be designed to count the number of packages that pass through such doorway for each unlocking event and to report such number to the data input device 7. Alternatively, the data input device 7 may be configured to prompt the user at the package door 3 for each tracking number or other package identifier of the packages being delivered or picked up. In other embodiments, other techniques and devices may be configured to track the number of packages delivered or picked up through the doorway of the package door 3.

Figure 3:
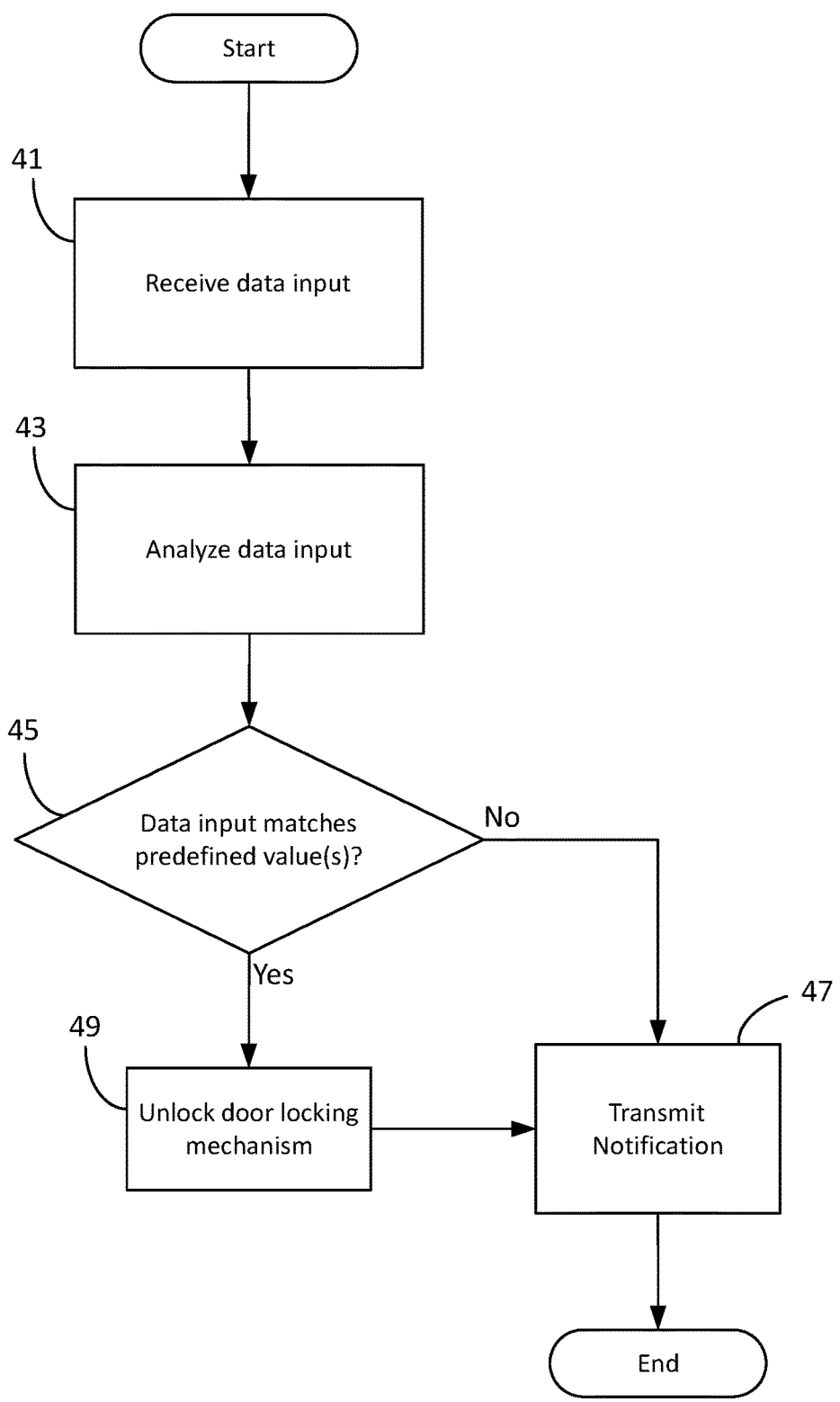
FIG. 3 is a flowchart illustrating an exemplary operation of a package door system, such as is depicted by FIG. 1.

FIG. 3 depicts an exemplary method of operation where the system logic 25 automatically determines whether to permit access to the interior of the house, building, box or other structure through the doorway of the package door 3 based on the attribute data 27. Referring to FIG. 3, assume that a courier at the package door 3 presses the doorbell interface 12 or a component (e.g., key) of the data input device 7. When an input is received via the doorbell interface 12 or the data input device 7, the input is transmitted to the computing device 19 to inform the system logic 25 of the courier's presence. In response, the system logic 25 transmits a control signal to the data input device 7 causing the data input device 7 to display a prompt requesting that the courier submit an input, such as a tracking number or other identifier of a package to be delivered or picked up by the courier. In response, the courier submits the requested information (e.g., tracking number) to the data input device 7, which transmits the information to the computing device 19 (step 41). Note that the courier may manually enter the information using a keypad or other input interface of the data input device 7, or the information may be automatically input or downloaded to the data input device 7. As an example, the data input device 7 may include a scanner (e.g., barcode scanner) that optically reads the tracking number or other information from a label of a package to be delivered. Alternatively, the tracking number or other information may be wirelessly transmitted from the package or a device carried by the courier to the data input device 7 using Bluetooth, radio frequency identification (RFID), near field communication (NFC), or other wireless technology.

The system logic 25 analyzes the data input received by the data input device 7 (step 43) and then determines whether such data matches at least one predefined value in the attribute data 27 (step 45). If not, a message is transmitted to a remote access device 21 via the WAN 17 (step 47). The message may include the value of the data entered, a timestamp of the entry, one or more digital images captured by the image capture device 9 (e.g., digital photographs or real-time video captured by the image capture device 9 at or close to the time that the courier inputted data to the data input device 7).

Alternatively, if the data entered into the data input device 7 matches a predefined value stored in the attribute data 27, the system logic 25 may instruct the door locking mechanism 5 to unlock (step 49), and a notification message is transmitted to a remote access device 21 via the WAN 17 (step 47). The message may indicate that access to the interior of the home, building or box through the doorway of the package door 3 has been permitted, and the message may include the value of the data entered, a timestamp of the entry, one or more digital images captured by the image capture device 9 (e.g., digital photographs or real-time video captured by the image capture device 9 at or close to the time that the courier inputted data to the data input device 7). In another embodiment, the door locking mechanism 5 is not automatically unlocked upon a match in step 45, but the system logic 25 instead sends a notification to the remote access device 21 to permit the user of the device 21 to decide whether to permit access via the package door 3. The notification may include the same notification information described above upon which the user may base his decision. If the user of the device 21 provides an input indicating that access is granted, the device 21 transmits a message the computing device 19 for causing the system logic 25 to unlock the door locking mechanism 5. If the user of the device 21 provides an input indicating that access is not granted, the device 21 transmits a message to the computing device 19 that instructs the system logic 25 to refrain from unlocking the door locking mechanism 5.

Note that the computing device 19 is shown in FIG. 1 is in communication with other components of the system 1 through the gateway 15. However, other configurations are possible, e.g., the computing device 19 communicates directly with the other components. For example, it is possible for the computing device 19 to be implemented as a web server connected to the WAN 17. Further, it is possible for fees to be charged to a user, such as the owner or occupant of the house or other building to which the package door 3 is mounted. As an example, a monthly or other recurring fee may be charged for a service of managing the unlocking events and collection of data. It is also possible for the charging of fees to be event based. For example, a fee could be charged per package for each package delivered or picked up, or a fee could be charged each time an unlock event occurs. Various other types of fees may be charged as may be desired from this system 1.

FIG. 4 is an illustration that depicts an exemplary embodiment of a door 4 that has an integrated package door 3 through which packages may be delivered or picked up. In some embodiments, the door 4 may be a conventional door, such as a front door of a home or other building, retrofitted with a package door 3. Alternatively, the door 4 may be equipped with a package door 3 at the time of manufacture. The door locking mechanism 5, data input device 7, image capture device 9, and doorbell system 11 are each coupled to a separate transceiver 13 configured to communicate wirelessly with a gateway 15 (see FIG. 1). The data input device 7 depicted in FIG. 4 is a keypad, configured to allow the entry of package tracking numbers, passwords, and other information. In other embodiments, other types of data input devices 7 may be used. In addition, the data input device 7 may have a display screen to permit messages (e.g., prompts) to be displayed to a user. The image capture device 9 depicted in FIG. 4 is a tablet computer equipped with a camera that can capture photographs and video. As described above, the image capture device 9 may be embedded in the door 4 such that its display screen (not shown in FIG. 4) is visible on the opposing face (see FIG. 5) of the door 4. In other embodiments, one or more of the camera and display screen of the image capture device 9 may be positioned on adjacent structures such as nearby walls. The image capture device 9 can display real-time video on the display screen such that it serves as a digital peephole.

As depicted in FIG. 4, the package door 3 is configured to swing open on hinges 57 when the door locking mechanism 5 is unlocked. The door 4 has a secondary locking mechanism 55 such that, when the secondary locking mechanism 55 is unlocked, the door 4 may swing open on hinges 59 to allow users to pass through its doorway or to allow for collection and delivery of packages too large to pass through the doorway of the package door 3. In certain embodiments, the secondary locking mechanism 55 is unlocked by the user of the remote access device 21 and/or the system logic 25 according to techniques similar to those described above for unlocking the locking mechanism 5. For example, if the user of the remote access device 21 observes photographs or real-time video showing a courier with a package too large to pass through the doorway of the package door 3, the user may use the remote access device 21 to signal, through the WAN 17, the system logic 25 to unlock secondary locking mechanism 55.

In other embodiments, package size information is stored in the attribute data 27 such that the system logic 25 is configured to unlock the secondary locking mechanism 55 automatically for particular packages. For example, a user or courier may enter into the attribute data 27, in advance of the courier's arrival, package information indicating that the package's size is too large to pass through the doorway of the package door 3. Upon the courier's arrival, the courier may enter the package tracking number into the data input device 7. The system logic 25 is configured to then analyze the attribute data 27 pertaining to such tracking number. If the tracking number entered using the data input device 7 matches the tracking number of a package stored in the attribute data 27, the computing device 19 based on the package size information included in the attribute data 27 may signal for the secondary locking mechanism 55 to automatically unlock. The courier may then enter through the doorway of the door 4 to collect or deliver the large package.

For any of the embodiments described herein, the computing device 19 may be configured to capture certain information about a package delivery or pickup and store such information in the package data 23. As an example, the package data 23 may include the tracking number or other identifier of each package delivered or picked up through the doorway of the package door 3 or otherwise. The package data 23 may correlate each tracking number with a time-stamp indicating the approximate date and time of delivery or pickup. In one exemplary embodiment, the tracking number is also correlated with sender or recipient information or identifiers, e.g., a name and/or address of a sender or recipient. Note that such information may be captured by the data input device 7. As an example, the information, such as a recipient or sender identifier, may be entered by the user delivering or picking up the package. Alternatively, such information may be scanned or wirelessly transmitted to the data input device 7 via the same techniques described above for capturing the tracking number or other identifier of the package. In one exemplary embodiment, the data input device 7 is used to capture the tracking number or other package identifier, and the tracking number or other package identifier is used to retrieve certain information, such as sender or recipient information, from the server 30.

In this regard, as described above, the server 30 is configured to store certain information about the packages being delivered by a specific courier service, such as Fed Ex®. Such information may include, for each package or delivery, the tracking number generated by the courier, tracking number generated by the system 1 (if not generated by the courier), recipient identifier (e.g., name or address), sender identifier (e.g., name or address), courier identifier, date and time of drop off to the courier service, and other information (e.g., demographic, transactional, or other types of information). When the system logic 25 decides to permit access to the interior of the house, building or box (e.g., decides to unlock the door locking mechanism 5) or at some other time, the system logic 25 transmits information about the package, such as its tracking number, to the server 30, and the server 30 uses the tracking number to lookup attributes of the identified package. As an example, the server 30 may look up and retrieve the recipient and/or sender information associated with the package and transmit such information to the computing device 19, which then stores the recipient and/or sender information in the package data 23. Thus, the package data 23 defines not just a history of when packages are delivered or picked up, but also a history of package attributes, such as names of the senders and/or recipients of the packages that are delivered or picked up. Such information may be useful to learn the habits or tendencies of the occupant of the house or building.

As an example, the package data 23 may indicate when and how often the occupant purchases product from a particular merchant or ships product to a particular customer. The occupant or other user may mine the package data 23 to discover information indicative of his shopping or business activity, or the occupant or other user may sell such data to a third party, such as an advertising company or merchant who may mine the data for the purpose of more effectively soliciting the occupant in the future or the government for census information. The package data 23 may be analyzed or used for other purposes in other embodiments.

As an example, based on the name of the senders for a particular recipient, information about the types of products purchased by the recipient can be gleaned or inferred. For example, the frequency of delivery from companies involved in a certain industry (e.g., beauty or hair care products) may be determined based on the product data 23. In addition, the system logic 25 may solicit certain demographic information from the user so that the product data 23 may be associated with such demographics. As an example, the system logic 25 may prompt the user to enter his or her race, age, sex, religious preference, or other types of demographics typically used for classifying consumers. In addition, the system logic 25 may determine the user's location, and this information may be included in the demographics that are included in the product data 23. Such location information may be input by the user, automatically obtained by a location sensor (e.g., GPS sensor) within the system 1 (e.g., within the data input device 7, doorbell system 11, or image capture device 9) or derived from the sender or recipient information.

In some embodiments, the system logic 25 is configured to compare location information to a map or other data indicating the likely wealth of the user based on his location. As an example, the user's location may be compared to a map of average home values to determine the average home value within the region in which the user is located. Such information may be useful for classifying the user by his likely wealth level since more wealthy individuals tend to live in areas with higher property or home values.

Accordingly, in addition to indicating the history of package deliveries, the package data 23 may include certain demographics about the user receiving shipments and transactional information about the frequency and types of shipments made to the user. By assimilating similar data from many users, trends in certain consumer behavior can be identified making the package data 23 valuable to persons wishing to sell services or products.

In some embodiments, the system logic 25 is configured to categorize deliveries based on product type and track the number of deliveries made within certain categories. As an example, one category may be beauty or hair-care products. The system logic 25 may be configured to search the name of the sender or other information about the sender for certain predefined keywords, such as "beauty" or "hair," that likely indicate the delivery corresponds to the category. If a correspondence is determined, the system logic 25 may increment or otherwise update the count for that category. In some embodiments, the sender may provide data indicative of the category corresponding to the product being delivered. Such information may appear on the package label, which can be read by the data input device 7 or stored at the server 30 and downloaded to the computing device 19. Further, the package data 23 may be updated to indicate the number of deliveries corresponding to a given category over a given time period.

Note that it is unnecessary for the system logic 25 to retrieve the package attributes, such as sender and/or recipient information, from the server 30 at the time of delivery or pickup. As an example, as described above, the system logic 23 may be configured to download certain package information from time-to-time. As an example, each day, the system logic 23 may contact the server 30 and download package information for each package to be delivered to the premises of the package door 3 that same day or over some other time period, such as the next 2 to 3 days. As an example, the occupant of the house or other building in which the package door 3 is mounted may be associated with an identifier (e.g., customer number), referred to herein as "customer identifier," that is associated with each package to be delivered to or picked up from the premises. The system logic 25 may be configured to transmit such customer identifier to the server 30, which uses the customer identifier as a key to look up various package information (e.g., tracking number, recipient or sender identifier, etc.) of each package associated with the customer identifier. The package information, such as tracking number and recipient or sender identifier, may be stored in the package data 23 before the package is delivered to or picked up from the premises by the courier service. Thus, once the package is actually delivered or picked up, it is unnecessary for the system logic 25 to contact the server 30 in order to account for the delivery or pickup in the package history maintained by the system logic 25.

In other embodiments, the system logic 25 may determine package attributes without necessarily contacting the server 30. As an example, the system logic 25 may receive package attributes from the data input device 7. In this regard, the same techniques used to determine a package identifier may be used to determine other package attributes. As an example, package attributes may be manually input to the data input device 7. Alternatively, the data input device 7 may scan or otherwise read a label of a package, such as a QR (quick response) code or a bar code, in order to determine package attributes. The data input device 7 could also capture an image of the label or other portions of the package and use OCR or some other suitable techniques for determining information printed on the label or other portions of the package. The package or a device carried by the person delivering the package may also be equipped with a wireless communication device, such as an RFID or NFC device, that wirelessly communicate package attributes, such as a package identifier, sender or recipient name, or other package information, to the data input device 7. In other embodiments, yet other techniques may be used to determine package attributes.

In addition, the system logic 25 of the computing device 19 may retrieve from the server 30 various information indicative of the status of each pending shipment that is associated with the customer identifier. In this regard, many courier services maintain package tracking information that indicates in real time the approximate location of the package as it is being delivered. The computing device 19 may contact the server 30 in order to access such information. The system logic 25 may include such information in the package data 23, which may be displayed to a user as may be desired. For example, the user of the remote access device 21 or the computing device 19 may view the package data 23 to determine which packages have been delivered and which packages are in route. In rendering the data 23, the system logic 25 may be configured to display a geographic map and, for each package in route, indicate the approximate location of the package on the map.

In some embodiments, a customer identifier is stored at the remote computing device 31 and is used to facilitate a purchase of a product to be delivered to via the package door 3. For example, the remote computing device 31 may store a predefined shipment address for a user (such as the owner or occupant of the house or building in which the package door 3 is mounted) and associate such shipment address with the user's customer identifier stored at the remote computing device 31. The remote computing device 31 may also associate other information with the customer identifier, such as financial information (e.g., information used to make a financial payment, such as credit card or debit card information) for a financial account of the user.

When the user makes a purchase online, the user may be prompted for his customer identifier by the merchant's server or other server (not shown), referred to herein as a "payment server," that is used to initiate a financial payment for the user or a shipment of a package to the user. As an example, the payment server may ask the user if he or she would like to utilize a service associated with the remote computing device 19, referred to hereafter as "identification service," in order to effectuate the purchase or shipment and, if so, to prompt the user to provide his or her customer identifier. Upon receiving the customer identifier from the user, the payment server may contact the remote computing device 31 via the WAN 17 or otherwise and submit the customer identifier as part of a request to retrieve the user's financial or shipment information. In response, the remote computing device 31 may reply with the shipment address and/or other information, such as financial information, associated with the customer identifier. The payment server may then use such information to automatically populate certain fields on one or more web pages for effectuating the purchase. As an example, the shipment address fields may be automatically filled in using the user's shipment address received from the remote computing device 31. Financial account fields (e.g., credit card number or debit card number, card expiration date, etc.) may be automatically filled in using the financial account information received from the remote computing device 31. Thus, the user is not burdened with having to manually complete such fields.

In some embodiments, the same customer identifier is used by multiple merchants or other entities needing the user's contact and/or financial information to effectuate a financial payment, shipment, or other type of transaction such that customer identifier is universally utilized by multiple merchants or other types of third parties. For example, the user may submit the customer identifier to multiple merchants for making multiple purchases. Each merchant may then use the customer identifier to retrieve from the remote computing device 19 shipping information (e.g., the address of the user) for shipping the purchased product or financial payment information (e.g., the address of the user, a credit card or debit card number, etc.) for effectuating a financial payment.

In the example described above, the identification service is provided by the remote computing device 31. However, it is possible for the identification service to be provided by other components of the system 1, such as the computing device 19 or the server 30 of the courier service responsible for delivering a package. When provided by the server 30, it is unnecessary for a merchant shipping a product to the user to acquire any shipping information pertaining to the user. In this regard, rather than providing the address of the user, the merchant may provide the user's customer identifier, and courier service may automatically link the shipment with the user identified by the customer identifier and, specifically with the shipment address that is associated with such customer identifier.

The identification service has various benefits to merchants or other entities that interact with the user. As an example, the identification service allows the merchants or other entities to efficiently obtain information about the user using the universal customer identifier that is associated with the service. Further, the user is not burdened with having to manually enter shipping or financial payment information when interacting with the merchant or other entity, thereby making the user's experience with the merchant or other entity more pleasant to the user. Also, the identification service allows such benefits without requiring the merchant or other entity to store the user's shipping or financial payment information between transactions, thereby relieving the merchant or other entity from data security obligations associated with such information.

The identification service provided by the remote computing device 31 also provides a convenient way for a user to change the shipment address that is used to ship packages to him or her. As an example, the owner or occupant of the house or building to which the package door 3 is mounted may use the computing device 19, the remote access device 21, or other component to communicate with the remote computing device 31 in order to update the shipment address that is associated with his or her customer identifier. Thereafter, when the remote computing device 31 is contacted by a payment server or other device to retrieve the shipment address, the new shipment address will be provided.

In one embodiment, the remote computing device 31 stores a calendar and a user is permitted to update the shipment address by the date. As an example, if the owner or occupant of the house or building in which the package door 3 is mounted plans to temporarily move or go to another address (e.g., go on vacation), then the user may change his or her shipment address only for the dates (referred to herein as "alternative date range") that he or she intends to be at the new address. Note that the request for the user's shipment address from the payment server or other device may include the expected arrival date of the shipment. If the arrival date is within the alternative date range, the remote computing device 31 is configured to return the new shipment address such that the package will be delivered to the new address by the merchant or other entity. Otherwise, the remote computing device 31 is configured to return the original shipment address (e.g., the address of the house or building in which the package door 3 is mounted). Thus, the shipment address provided by the identification service is based on the expected date of arrival of the package. Similar techniques may also be used to update and/or control which financial account (e.g., credit card number or debit card number) that is to be used to pay for a transaction. In another embodiment, the calendar functionality may be used to prevent the delivery of packages for a specified date ranges.

Note that the identification service described above may be performed independent of the package delivery aspects of the system 1. As an example, the identification service may be a stand-alone service that is offered to merchants or other entities by a computing device 31, such as a server, without the computing device 31 performing any of the delivery monitoring operations, including control of the door locking mechanism 5, described herein.

In addition, note that it is also unnecessary for any of the package information collected by the computing device 19 to be retrieved from the server 30. As an example, any information (e.g., sender identifier, recipient identifier, courier identifier, or other information described herein) may be determined by the data input device 7. As an example, the data input device 7 may prompt the user at the package door 3 for any such information. Such information may be scanned from a bar code or other optical code on the package or other source. An image of the package label may be captured and optical character recognition (OCR) or other techniques may be used to read information from the label. Yet other techniques for acquiring information collected and tracked by the system 1 are possible in other embodiments.

Figure 6:
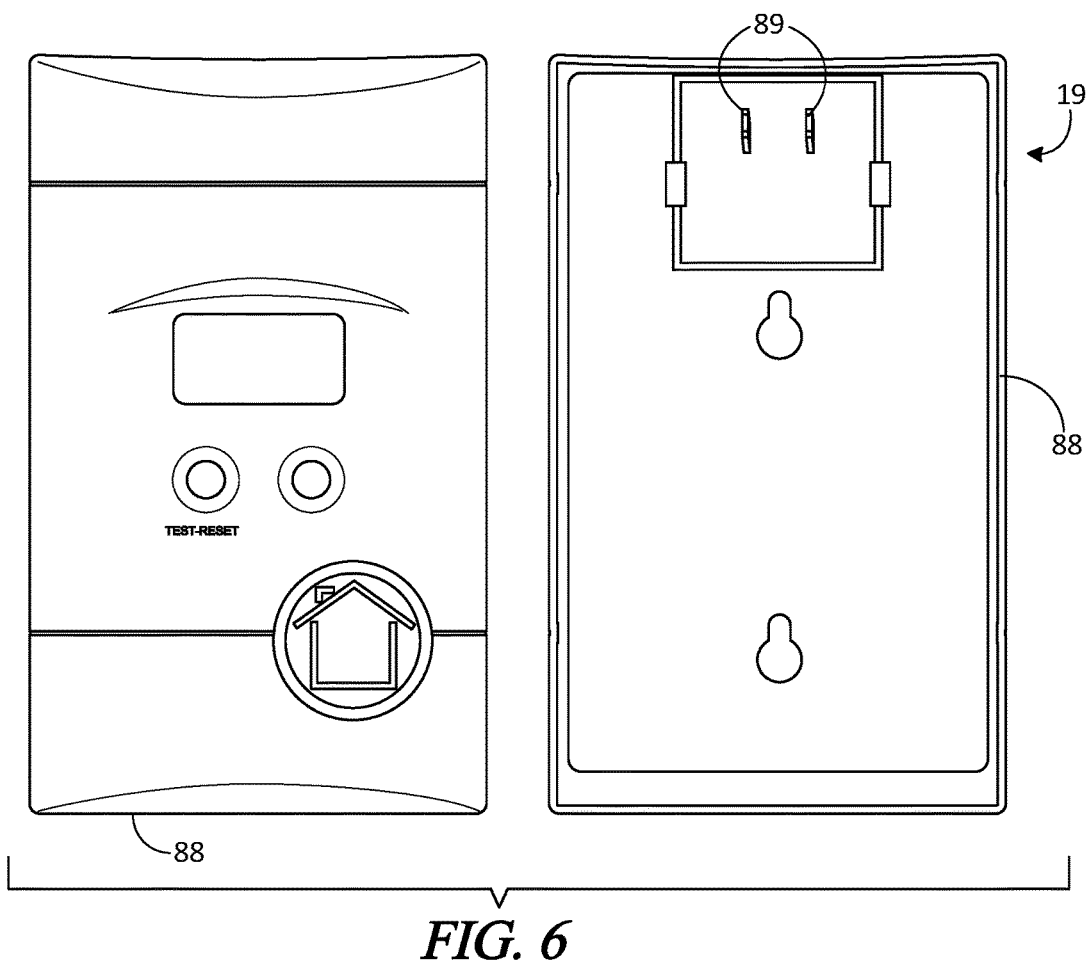
FIG. 6 is an illustration of an exemplary embodiment of a computing device, such as is depicted by FIG. 1.

The computing device 19 is shown in FIG. 1 as communicating with the transceivers 13 through a gateway 15. However, it should be emphasized that other configurations are possible. As an example, the computing device 19 may communicate with any of the data input device 7, the image capture device 9, the doorbell system 11, or the WAN 17 directly without communicating through the gateway 15. FIG. 6 shows an exemplary embodiment of the computing device 19 that is adapted to plug into a power outlet, which may be mounted on a wall near the package door 3. In this regard, the computing device 19 of FIG. 6 has a housing 88 in which electronic components of the computing device 19 are situated. Extending from a back of the housing 88 is a pair of male connectors 89 defining an electrical plug for plugging into the power outlet for receiving power from the power outlet, and such power is used to operate the electronic components of the computing device 19.

The computing device 19 may be positioned close to the transceivers 13 so that short-range protocols, such as Bluetooth, can be used to communicate between the computing device 19 and the transceivers 13. In such embodiment, the computing device may define a Wi-Fi hotspot and communicate with the WAN directly 17 (e.g., using a cellular connection) or through the gateway 15. In other embodiments, other configurations of the computing device 19 are possible.

In various embodiments described above, access through the package door 3 is based on a comparison of a package identifier to the attribute data 27. However, it should be emphasized that other types of comparisons may be performed in order to determine whether to unlock the door locking mechanism 5. As an example, as described above, a password may be used instead of a package identifier. As used herein, an "authorization code" refers to any information, such as a package identifier or password, that is used to authenticate a user for the purpose of unlocking the door locking mechanism 5. In one embodiment, the authorization code may be a temporary code that is valid for only a single use or for only a limited time, such as one day or one week. Such code may be provided to the person needing access through the package door 3, and the code may be received by the data input device 7 and used for comparison to the attribute data 27 in order to determine whether to unlock the door locking mechanism 5, as described above for the package identifier. In another embodiment, the authorization code may be provided to the system operator for approval. If the system operator approves the authorization code provided by the user, the system operator can select an option on the remote access device 21 that sends a command to unlock the door locking mechanism 5.

Figure 7:
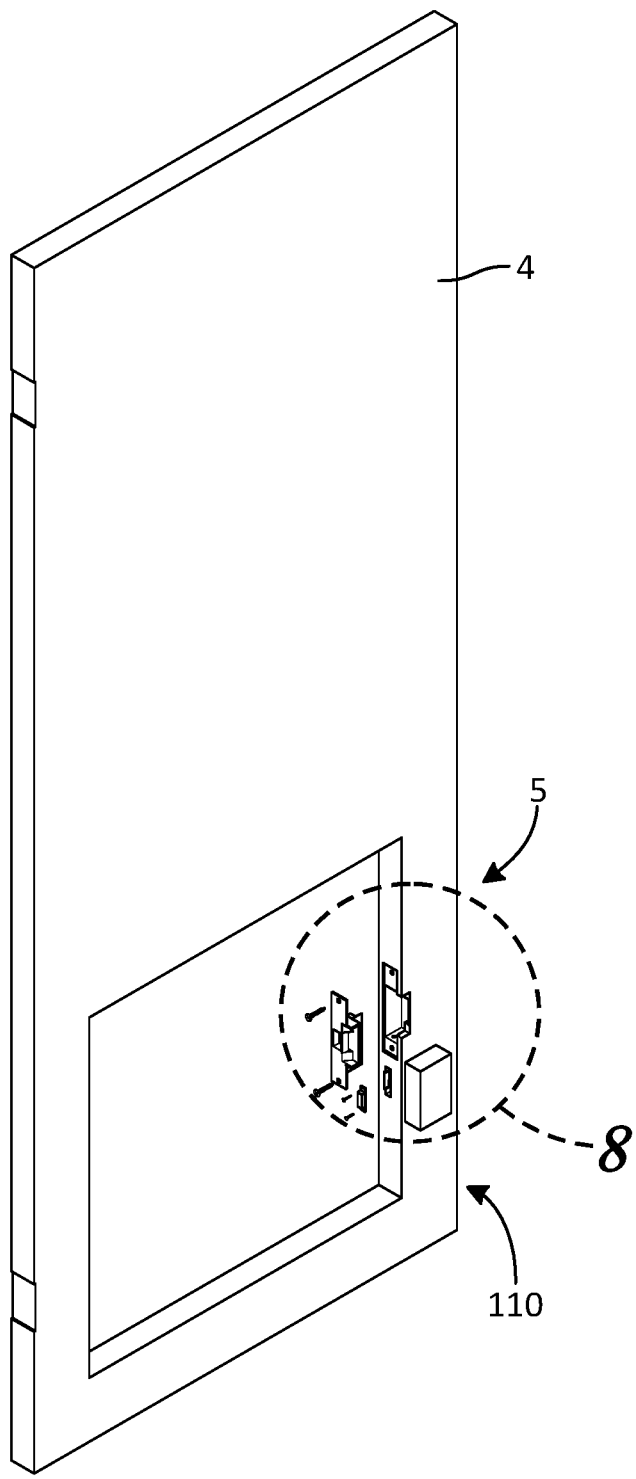
FIG. 7 is an illustration of a door with an alternate embodiment of the door locking mechanism.
Figure 8:
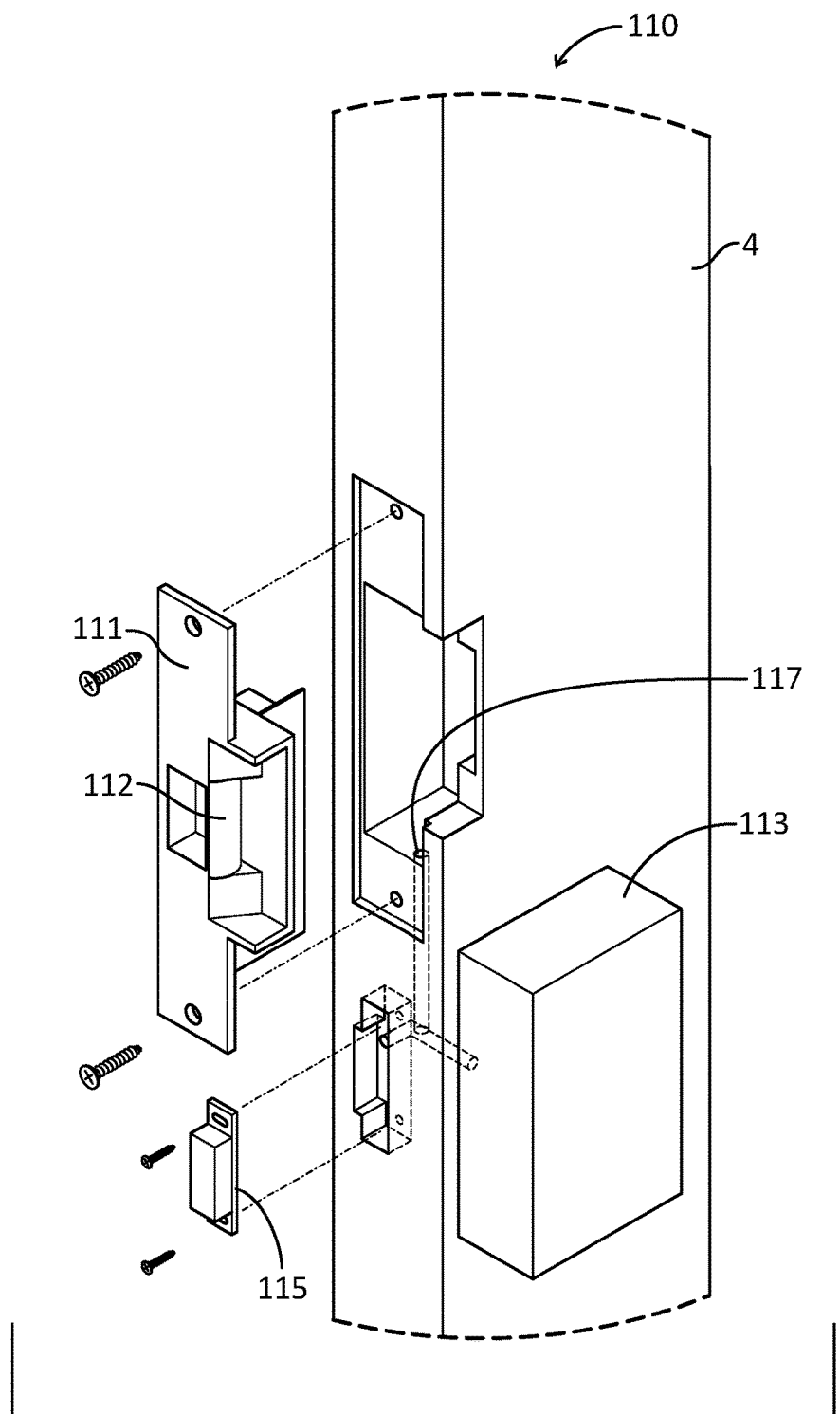
FIG. 8 is an exploded view of a portion of the door locking mechanism from detail 8 of FIG. 7.
Figure 9:
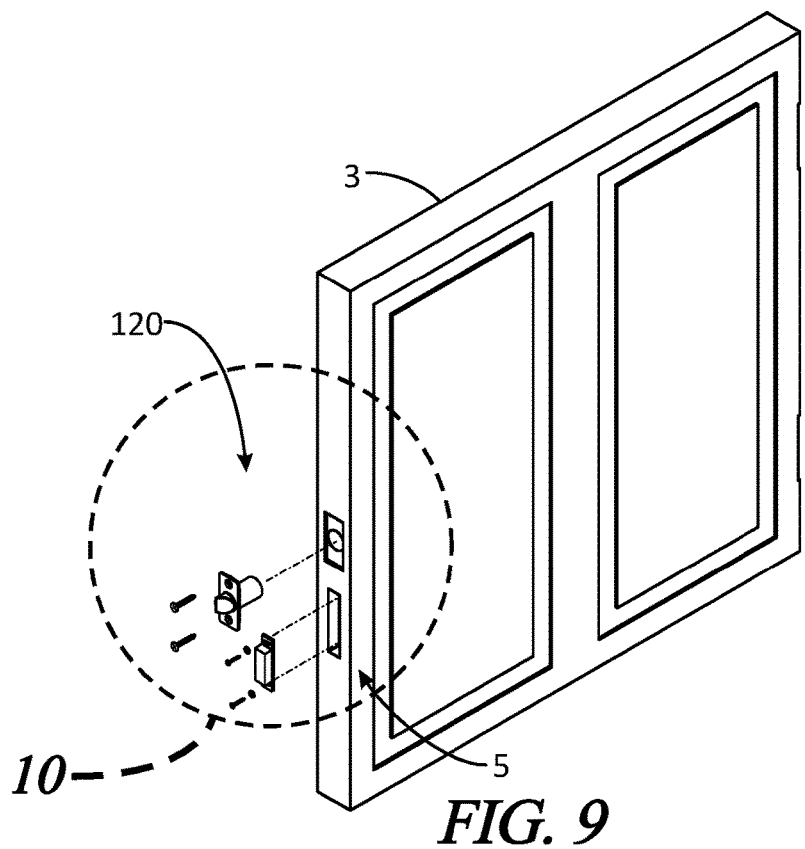
FIG. 9 is an illustration of a package door with an alternate embodiment of the door locking mechanism.
Figure 10:
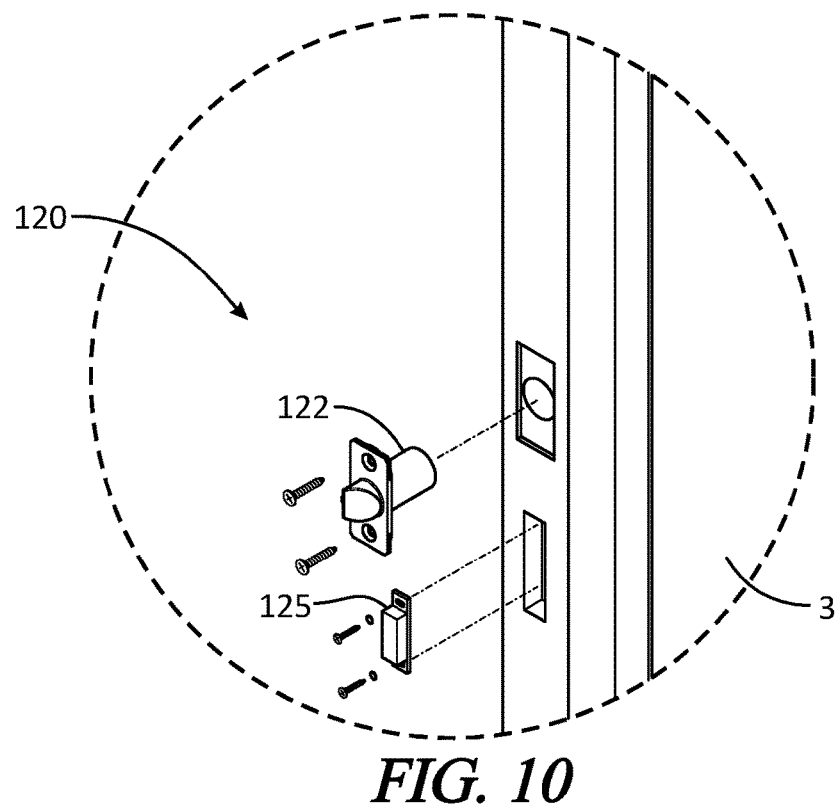
FIG. 10 is an exploded view of a portion of the door locking mechanism from detail 10 of FIG. 9.

FIGS. 7-10 show an alternate embodiment of the door locking mechanism 5 used to close and lock the package door 3. The door locking mechanism 5 has a strike plate assembly 110 mounted in the door 4 as shown in FIGS. 7 and 8 and a latch assembly 120 mounted in the package door 3 as shown in FIGS. 9 and 10. The latch assembly 120 engages with the strike plate assembly 110 to close and/or lock the package door 3. While FIGS. 7-10 show the strike plate assembly 110 and the latch assembly 120 used for closing and locking the package door 3 when the package door 3 is the door 4, the use of the strike plate assembly 110 and the latch assembly 120 can be used to close and lock the package door 3 in other locations where the package door 3 may be mounted, e.g., a box, a bench or a wall.

As shown in FIGS. 7 and 8, the strike plate assembly 110 can use an electric strike to control the locking and unlocking of the package door 3. The strike plate assembly 110 has a faceplate 111 fixedly attached to the door 4 and a movable latchbar 112. The pivoting movement of the latchbar 112 is controlled by the controller 113. The controller 113 can receive power from an external power source, e.g., batteries or a wall outlet, and can provide the current needed to pivot the latchbar 112 to an unlocked position (from a normally locked position) to permit a latch of the package door 3 to pass by the latchbar 112 and the package door 3 to be opened. The controller can be electrically connected to the latchbar 112 by wires (not shown) located in passageway 117 in door 4. In another embodiment, the controller 113 can provide the current needed to move and hold the latchbar 112 in a locked position (from a normally unlocked position) to prevent the package door 3 from being opened.

The controller 113 can receive door position signals from a proximity sensor to determine whether the package door 3 is in an open position or a closed position. When the package door 3 is in the closed position, a first part 115 of the proximity sensor mounted in door 4 can be aligned with a second part 125 (see FIG. 10) of the proximity sensor mounted in package door 3. In one embodiment, the first part 115 of the proximity sensor can be a reed switch and the second part 125 of the proximity sensor can be a magnet used to open or close the reed switch when the second part 125 of the proximity sensor is aligned (or near) the first part 115. In another embodiment, the first part 115 of the proximity sensor can be incorporated within the strike plate assembly 110.

The first part 115 of the proximity sensor can send a signal to the controller 113 indicating that the package door 3 is in a closed position in response to the first part 115 of the proximity sensor being substantially aligned (or near) the second part 125 of the proximity sensor. Upon receiving the signal indicating the package door 3 is in the closed position, the controller 113 can remove any current being provided to the latchbar 112 to permit the latchbar 112 to return to the locked position to lock the package door 3 in the closed position. As the second part 125 of the proximity sensor moves away from the first part 115 of the proximity sensor (e.g., after the latchbar 112 has been moved to an unlocked position), the first part 115 can send the controller 113 a signal indicating that the package door 3 is in an open position, i.e., the package door 3 is not closed. In one embodiment, the signal indicating the package door 3 is in an open position can be the absence of the "closed position" signal from the first part 115. If the controller 113 receives an open position signal, the controller 113 can continue to provide current to the latchbar 112 to prevent the package door 3 from being unable to reach the closed position as a result of the latchbar 112 being in the locked position before the package door 3 is in the closed position.

Figure 11:
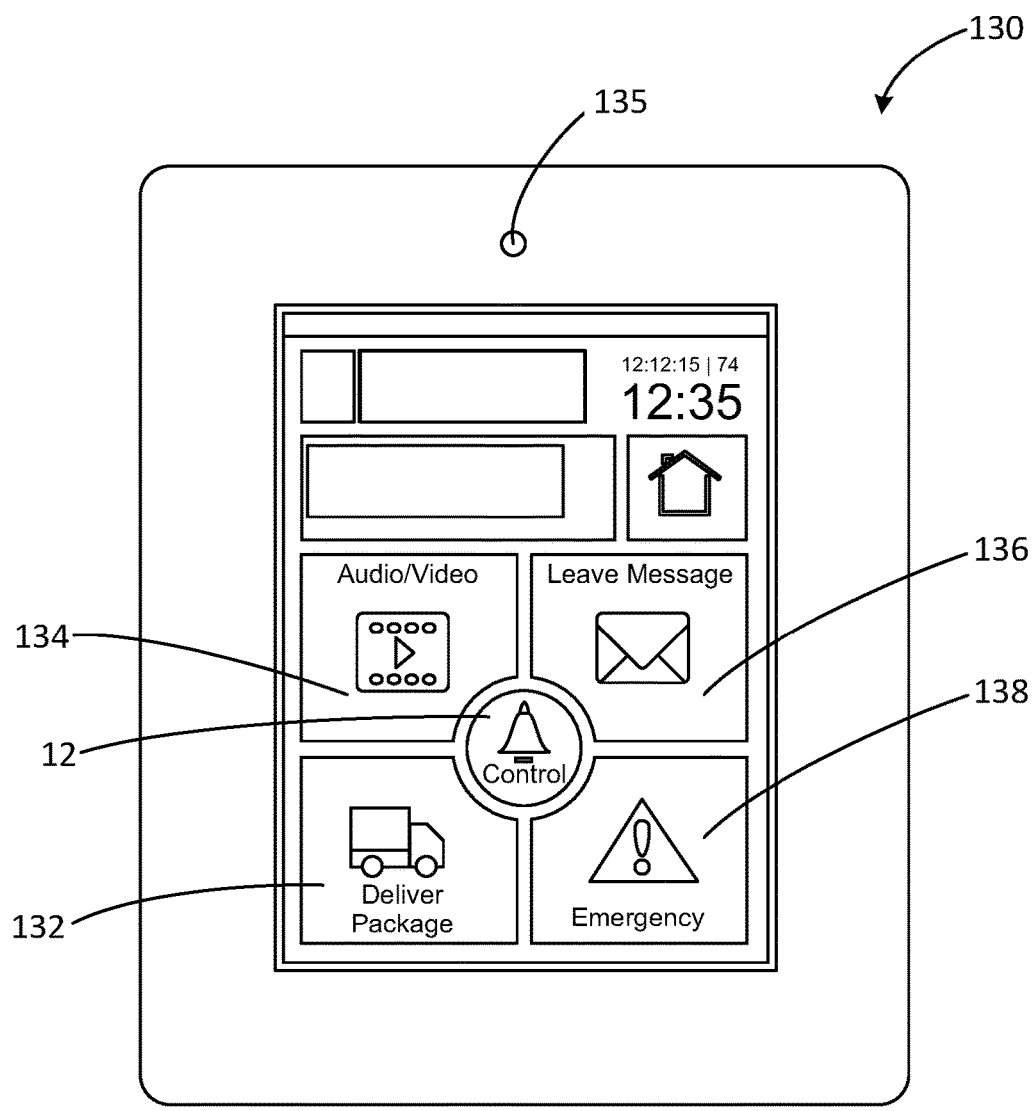
FIG. 11 is an illustration of an alternate embodiment of a user interface for the package door system.

The controller 113 can include a transceiver to enable wireless communication with the computing device 19, the remote access device 19 or a user interface 130 (see FIG. 11). For example, the controller 113 can wirelessly receive a command from the computing device 19, the remote access device 19 or user interface 130 to unlock the package door 3 as described above with respect to the door locking mechanism 5. In addition, the controller 113 can wirelessly provide the computing device 19, the remote access device 19 or user interface 130 with information on the position of the package door 3, i.e., opened or closed, in response to an inquiry by a system operator on a remote access device 21. In another embodiment, the controller 113 and the computing device 19 or user interface 130 may by connected by a wired connection. In one embodiment, the controller 113 can be connected to a light pipe through the door 4 with an opening in the exterior surface of the door 4. The controller 113 can include an optical sensor connected to the light pipe to determine if something, e.g., a person, animal or object, is near the package door 3. The controller 113 can use the information provided by the optical sensor in determining when to lock and unlock the package door 3.

As shown in FIGS. 9 and 10, the latch assembly 120 can be mounted in the package door 3. The latch assembly 120 can include a latch 122 that extends from the side of the package door 3 and is the part that engages with the strike plate assembly 110 to close the package door 3. The latch 122 can be held in the strike plate assembly 110 by the latchbar 112 when the latchbar 112 is in the locked position. When the latchbar 112 is in the unlocked position, the latch 122 can move past the latchbar 112 to permit the package door 3 to open.

In another embodiment, the strike plate assembly 110 and the latch assembly 120 can be incorporated into door 4 or any other hinged structure that opens and closes similar to door 4. The strike plate assembly 110 and the latch assembly 120 can operate as described above to control the opening and closing of door 4 instead of package door 3.

FIG. 11 shows an embodiment of a user interface 130 that can be positioned on or near the package door 3. The user interface 130 can combine the data input device 7, the image capture device 9 and the doorbell system 11 into a single shared interface. In one embodiment, the user interface 130 can be a tablet computer, but can include any type touchscreen interface or other type of interface coupled to a processing element in other embodiments. In another embodiment, the user interface 130 can also incorporate the computing device 19 in addition to the data input device 7, the image capture device 9 and the doorbell system 11. The user interface 130 can provide a user approaching the user interface 130 with several different options from which to select.

The user can select the doorbell interface 12 of the doorbell system 11 to ring a doorbell at the building or residence associated with the package door 3. The doorbell system 11 can operate as described above and can provide a system operator with an electronic peephole via remote access device 21 to view the person at the user interface 130. The electronic peephole provided by the doorbell system 11 can use a camera 135 of the image capture device 9 incorporated into the user interface 130 to capture an image of the user.

A deliver package option 132 can be used by delivery persons attempting to deliver a package or other deliverable to the building or residence. Once the user selects the deliver package option 132, the user interface 130 can guide the user through a series of steps to complete the delivery of the package. In one embodiment, after the user selects the deliver package option 132, the user can be prompted to enter the tracking code for the delivery into the user interface 130 similar to the entry of the code into the data input device 7. A picture of the user can then be taken using the camera 135 of the image capture device 9. The package door 3 can then be opened, as described above, either automatically based on the entry of the tracking code or based on an input from the system operator and the user can place the package inside the package door 3 in the corresponding storage area associated with the package door 3, e.g., within the building or residence or within a storage box located at the building or residence. Once the package is placed within the storage area and the package door 3 is closed, a second picture of the user can be taken with the camera 135 to confirm delivery. The information and pictures captured by the user interface 130 can be sent to the system operator on the remote access device 21 in an email or other type of message.

The audio/video option 134 can be used to access audio and/or video messages that are provided for the user. The system operator can leave a message for the user delivering a package that includes additional instructions and/or an image of the system operator's signature. The user can be notified that there is a message for the user when accessing the deliver package option 132. To access the message using the audio/video option 134, the user may have to enter a password or provide some other form of identification (e.g., show an identification badge) to prevent unauthorized viewing of messages. In another embodiment, the message may automatically become accessible and/or displayed upon the entry of the tracking code during the deliver package option 132. In still another embodiment, the audio/video option 134 may be used to provide messages to other users beside package delivery personnel. For example, a system operator may leave a message for an expected guest that the system operator will be arriving to the building or residence in a few minutes. In one embodiment, the selection of the audio/video option 134 can open a 2-way communication channel between the user at user interface 130 and the system operator at the remote access device 21.

The leave message option 136 can be used by the user to leave a message for the system operator regarding the delivery of the package. For example, the user may leave a video message using camera 135 that the package could not be delivered because a signature is required and could inform the system operator when a redelivery may occur. In another embodiment, the leave message option 136 can be used by other users besides package delivery personnel to leave messages for the system operator. For example, a friend may leave a message for the system operator indicating that the friend had stopped for a visit, but that the system operator was not available.

The emergency option 138 can be used to activate a siren or other device to alert nearby people that the user at the user interface 130 may need assistance. In one embodiment, the selection of the emergency option 138 can send a message to the remote access device 21 of the system operator and/or contact emergency service personnel, e.g., police, fire or ambulance personnel, informing the system operator and/or the emergency service personnel of a possible situation at the user interface 130. In another embodiment, the selection of the emergency option 138 may engage a 2-way communication link (using audio and/or video capabilities provided by camera 135) between the user and the system operator and/or emergency service personnel. In still another embodiment, the selection of the emergency option 138 may automatically trigger the operation of the camera 135 of the image capture device 9 to record any events that may occur at the user interface 130.

FIG. 12 shows an embodiment of the package door 3 as part of a bench 142. The package door 3 can be incorporated into the seat or a portion of the seat of the bench 142. In addition, the bench 142 can include an enclosed storage area (not shown) accessible via the package door 3. When the package door 3 is unlocked, the user can raise the package door 3 (seat of the bench 142) to place the package in the enclosed storage area. The user can then lower the package door 3 (seat of the bench 142) to complete the delivery of the package. In one embodiment of the bench 142, the package door 3 can be closed and locked using the strike plate assembly 110 and the latch assembly 120. However, other locking mechanisms can be used in other embodiments.

FIGS. 13 and 14 show an embodiment of the package door 3 incorporated in a storage container or box 144. The package door 3 can operate as the lid or top of the storage box 144 or can be incorporated into the lid or top of the storage box 144. However, in other embodiments, the package door 3 can be incorporated into other parts of the storage box 144. The package door 3 of the box 144 can be held in the closed position by the latch assembly 120 engaging with the strike plate assembly 110 as described above. However, in other embodiments, different closing and locking mechanisms may be used.

Figure 15:
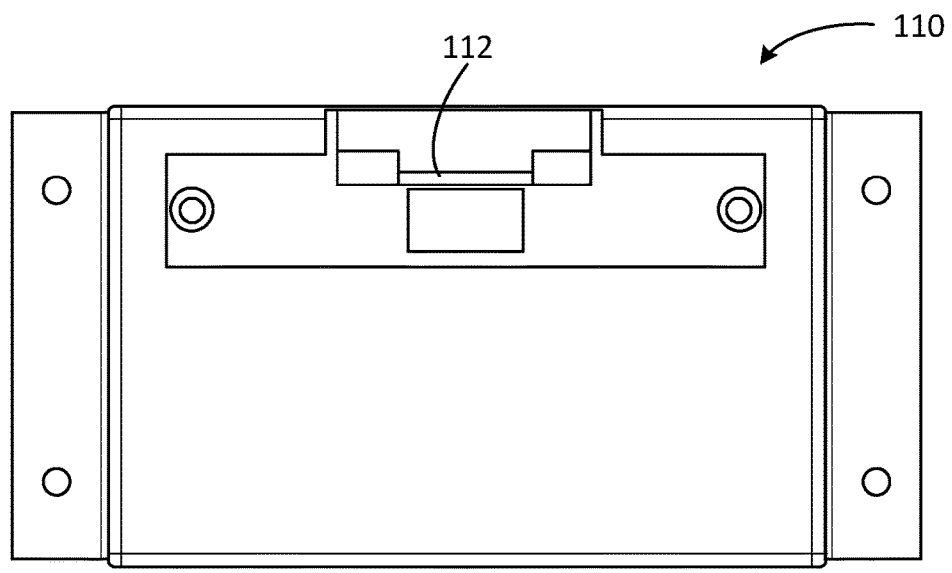
FIGS. 15 and 16 are front and rear views of the strike plate assembly of FIG. 14.
Figure 16:
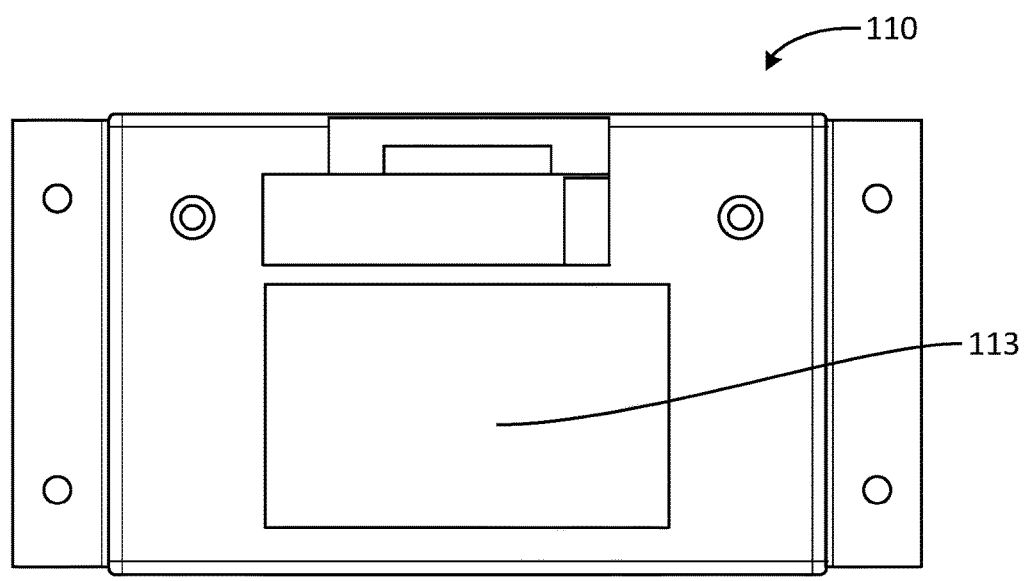

In one embodiment, the strike plate assembly 110 can be mounted to an interior wall of the storage box 144 and the latch assembly 120 can be mounted to the interior surface of the package door 3 (operating as the lid or top of the storage box 144). When the controller 113 as shown in the rear view of the strike plate assembly 110 of FIG. 16 receives a signal indicating that the package door 3 should be opened, the controller 113 can provide current to move the latch bar 112 as shown in the front view of the strike plate assembly 110 of FIG. 15 to the unlocked position and permit the package door 3 to be opened. When the package door 3 is opened, the user can place the package in enclosed storage space 146 to store the delivered package until the system operator retrieves the delivered package from the enclosed storage space 146. Once the package door 3 is returned to the closed position, the latchbar 112 can be returned to the locked position to lock the package door 3.

Various examples are provided herein in an effort to convey a clear understanding of the subject matter described in this application. Various changes or modifications to the described examples would be apparent to a person of ordinary skill upon reading this disclosure. Also, several embodiments are described above in the context of enabling the collection and delivery of packages. It should be emphasized that the package door systems and techniques described herein may be used for other purposes in other contexts. For example, the system 1 may be used by a landlord to allow entry of a lessor into a vacation rental.

Now, therefore, the following is claimed:

1. A package door system, comprising:
    a first door;
    a second door, wherein the first door is mounted in the second door;
    a door locking mechanism coupled to the first door;
    a data input device configured to receive, from a user, an authorization code for a package to be delivered or picked up through the first door;
    a display screen configured to display to the user at least one image via the display screen, wherein the displayed at least one image includes an image of a signature from a system operator, wherein the image of the signature from the system operator is displayed to the user in response to receipt of the authorization code by the data input device; and
    at least one computing device configured to receive the authorization code from the data input device and to perform a comparison between the authorization code and attribute data indicative of at least one package to be delivered or picked up by a courier service, the at least one computing device further configured to control the door locking mechanism based on the comparison.

2. The system of claim 1, wherein the authorization code includes a package identifier that identifies the package to be delivered or picked up.

3. The system of claim 1, further comprising an image capture device configured to capture at least one image in response to a detection of the user at the first and second doors.

4. The system of claim 3, further comprising a doorbell interface, wherein the detection is based on the doorbell interface.

5. The system of claim 3, wherein the at least one computing device is configured to transmit the captured at least one image through a network to a remote access device and to receive, from the remote access device, a message indicating whether the at least one computing device is authorized to unlock the door locking mechanism, and wherein the at least one computing device is configured to control the door locking mechanism based on the message.

6. The system of claim 3, wherein the display screen is a first display screen and the image capture device comprises a second display screen and is configured to display the captured at least one image via the second display screen.

7. A system for facilitating deliveries, comprising:
    a first door;
    a door locking mechanism coupled to the first door;
    a data input device configured to receive, from a user, an authorization code for a package to be delivered or picked up through the first door;
    a user interface having a display screen mounted near the first door, wherein the user interface is configured to enable a system operator to provide a message for the user with the display screen, wherein the message includes an image of a signature from the system operator, and wherein the image of the signature from the system operator is displayed to the user in response to receipt of the authorization code by the data input device; and
    at least one computing device configured to receive the authorization code from the data input device and to perform a comparison between the authorization code and attribute data indicative of at least one package to be delivered or picked up by a courier service, the at least one computing device further configured to control the door locking mechanism based on the comparison, wherein the at least one computing device is configured to store in memory a plurality of attributes for a plurality of packages delivered through the first door thereby defining an attribute history for the plurality of packages, and wherein each of the attributes is selected from at least one of the group including: a sender name and a category of a product contained by a respective one of the plurality of packages.

8. The system of claim 7, further comprising a second door, wherein the first door is mounted in the second door, the door locking mechanism comprises a latch assembly connected to the first door, a strike plate assembly connected to the second door and a controller configured to transition the strike plate assembly between a locked position and an unlocked position, the first door being in a closed position upon the latch assembly engaging the strike plate assembly, and wherein the controller is configured to receive an instruction from the at least one computing device to transition the strike plate assembly from the locked position to the unlocked position to permit the first door to move from the closed position to an open position.

9. The system of claim 7, wherein authorization code includes a package identifier that identifies the package to be delivered or picked up, and the at least one computing device is configured to communicate with a remote server for downloading at least one of the attributes.

10. The system of claim 7, wherein the at least one computing device is configured to transmit a notification to a remote access device based on the comparison.

11. The system of claim 7, wherein the data input device is configured to read a label of at least one of the plurality of packages to determine one or more of at least one of the attributes or the authorization code.

12. The system of claim 7, wherein the data input device is configured to determine at least one of the attributes via wireless signals communicated between the data input device and at least one of the plurality of packages.

13. The system of claim 7, wherein the data input device is coupled to a wireless communication device for wirelessly transmitting the authorization code to the at least one computing device.

14. The system of claim 7, wherein the at least one computing device includes a local computing device and a remote computing device, the local computing device configured to transmit data indicative of the attribute history to the remote computing device via a network, wherein the remote computing device is configured to associate the data with a customer identifier, and wherein the remote computing device is further configured to receive the customer identifier from a remote server and, in response, to transmit an address to the remote server.

15. The system of claim 7, further comprising an image capture device configured to capture at least one image in response to a detection of the user at the first door.

16. The system of claim 15, wherein the at least one computing device is configured to transmit the image through a network to a remote access device and to receive, from the remote access device, a message indicating whether the at least one computing device is authorized to unlock the door locking mechanism, and wherein the at least one computing device is configured to control the door locking mechanism based on the message.

17. The system of claim 7, wherein the first door is incorporated in one of a box or bench.

18. The system of claim 7, further comprising a tablet computer, wherein the tablet computer includes the data input device and the user interface, the tablet computer configured to provide one or more selectable options to the user via the display screen, the selectable options comprising one or more of a doorbell interface, opening a two way communication channel with the system operator, or contacting emergency service personnel.

19. A method for facilitating deliveries, comprising:
receiving, from a user, an authorization code for a package to be delivered or picked up through a first door;
displaying to the user at least one image via a display screen in response to the receiving, wherein the displayed at least one image includes an image of a signature from a system operator;
comparing by at least one computing device the authorization code to attribute data indicative of at least one package to be delivered or picked up by a courier service;
automatically unlocking the first door based on the comparing; and
storing, in memory, a plurality of attributes for a plurality of packages delivered through the first door thereby defining an attribute history for the plurality of packages, wherein each of the attributes is selected from at least one of the group including: a sender name and a category of a product contained by a respective one of the plurality of packages.

20. The method of claim 19, wherein the authorization code includes a package identifier that identifies the package to be delivered or picked up.

21. The method of claim 19, further comprising receiving the authorization code by the at least one computing device from a remote server.

22. The method of claim 19, further comprising determining a category of a product contained by at least one of the plurality of packages based on a sender name for the at least one package.

23. The method of claim 19, further comprising:
electronically reading a label of at least one of the plurality of packages; and
determining, based on the reading, one or more of at least one of the attributes or the authorization code.

24. The method of claim 19, further comprising:
communicating wireless signals with at least one of the plurality of packages; and
determining at least one of the attributes based on the communicating.

25. The method of claim 19, further comprising:
associating the attribute history with a customer identifier;
associating the customer identifier with a shipment address;
receiving the customer identifier from a payment server that is effectuating a purchase of a product to be shipped by the package; and
transmitting the shipment address to the payment server.

26. The method of claim 19, further comprising:
sensing a presence of the user at the first door; and
capturing an image of the user in response to the sensing.

27. The method of claim 26, wherein the sensing is based on the user interaction with a doorbell interface.

28. The method of claim 26, further comprising:
transmitting the captured image through a network to a remote access device; and
receiving by the at least one computing device a message from the remote access device indicating whether the at least one computing device is authorized to unlock the first door,
wherein the unlocking is based on the message.

* * * * *